United States Patent
Chen et al.

(10) Patent No.: US 12,328,153 B2
(45) Date of Patent: Jun. 10, 2025

(54) INTERFERENCE INFORMATION DETECTION METHOD

(71) Applicant: HUAWEI TECHNOLOGIES CO., LTD., Guangdong (CN)

(72) Inventors: Weixi Chen, Nanjing (CN); Wei Zhang, Nanjing (CN); Ran Sang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 452 days.

(21) Appl. No.: 17/958,063

(22) Filed: Sep. 30, 2022

(65) Prior Publication Data
US 2023/0114391 A1     Apr. 13, 2023

(30) Foreign Application Priority Data

Oct. 8, 2021  (CN) .......................... 202111172038.3
Dec. 2, 2021  (CN) .......................... 202111511288.5

(51) Int. Cl.
*H04B 17/345*     (2015.01)

(52) U.S. Cl.
CPC ................... *H04B 17/345* (2015.01)

(58) Field of Classification Search
None
See application file for complete search history.

(56) References Cited

U.S. PATENT DOCUMENTS

| | | | |
|---|---|---|---|
| 2004/0203474 A1* | 10/2004 | Miller ................ | H04L 1/0001 455/63.1 |
| 2007/0293218 A1* | 12/2007 | Meylan ............ | H04W 56/0045 455/434 |
| 2009/0238095 A1* | 9/2009 | Blackwell ............. | H04W 24/08 370/254 |
| 2015/0146625 A1 | 5/2015 | Bruhn et al. | |
| 2020/0288324 A1 | 9/2020 | Ford et al. | |
| 2022/0174732 A1* | 6/2022 | Xia ........................ | H04W 16/14 |
| 2024/0235750 A1* | 7/2024 | Omar ..................... | H04L 5/0035 |

FOREIGN PATENT DOCUMENTS

CN     110602712 A     12/2019

* cited by examiner

*Primary Examiner* — Anh Vu H Ly
(74) *Attorney, Agent, or Firm* — WOMBLE BOND DICKINSON (US) LLP

(57) ABSTRACT

An interference information detection method and a related apparatus are disclosed. The method includes: A server collects information about the plurality of frames from the plurality of stations, where information about some of the plurality of frames includes sending time, contention time, and frame duration, and the contention time indicates time at which a corresponding frame starts to wait to be sent or duration in which the corresponding frame waits to be sent; and the server determines the interference information about the plurality of stations based on the information about the plurality of frames.

20 Claims, 12 Drawing Sheets

Interference source
proportion of an AP 1

INTERFERENCE INFORMATION DETECTION METHOD

CROSS-REFERENCE TO RELATED APPLICATION

This application claims priority to Chinese Patent Application No. 202111172038.3, filed on Oct. 8, 2021, and Chinese Patent Application No. 202111511288.5, filed on Dec. 2, 2021. The afore-mentioned patent applications are hereby incorporated by reference in their entireties.

TECHNICAL FIELD

This application relates to the field of communication technologies, and in particular, to an interference information detection method.

BACKGROUND

In a wireless local area network (WLAN), with the deployment of large broadband continuous networking, a quantity of access points (AP) is increasing. Therefore, interference between different access points becomes more severe, thereby affecting a data throughput and user experience.

Currently, a cause of interference to an AP is usually detected through channel scanning-based interference information detection. Specifically, the AP scans a signal of a neighboring AP to obtain a service set identifier (SSID) and a received signal strength indication (RSSI) of the neighboring AP, and constructs a network topology of the APs. When the RSSI of the neighboring AP is greater than a threshold, the neighboring AP is considered as an interfering AP.

Only interfering APs can be determined through the foregoing interference information detection, and a detection granularity (the granularity is an AP of level 1) of interference information is large. Consequently, how interference affects performance of the AP cannot be accurately described.

SUMMARY

According to a first aspect, this application provides an interference information detection method. The method is applied to a server, and includes: The server collects information about a plurality of frames from a plurality of stations, where the information about the plurality of frames includes a first frame information set, information about each frame in the first frame information set includes sending time, contention time, and frame duration, and the contention time indicates time at which a corresponding frame starts to wait to be sent or duration in which the corresponding frame waits to be sent; and the server determines interference information of the plurality of stations.

Specifically, after collecting the information about the plurality of frames, the server processes the information about the plurality of frames in a time sequence, to determine the interference information of the plurality of stations. The server may process information about the plurality of frames in one or more time periods. The time period may be preconfigured, or may be determined based on a user instruction. This is not limited in this application.

After the server collects information about a frame, the server determines waiting time, sending time, frame duration, and sending end time of the frame. For example, the server determines a moment at which the frame enters the waiting time, duration of the waiting time, a moment at which the frame starts to be sent, duration of sending, and a moment at which sending of the frame ends. Then, the server searches, based on the information, whether another frame causes interference to the frame. For example, the server determines whether another frame causes interference to the frame within a sending time period of the frame. The sending time period is a time period from a moment of entering the waiting time to a moment of ending sending. Causing interference means that a sending time period of the another frame overlaps the sending time period of the frame.

After determining the another frame that causes interference to the frame, the server determines interference information of the another frame. The interference information includes but is not limited to: The server determines frames causing interference as interference frames of the frame. A station that sends an interference frame serves as an interference source of the frame. Overlapping time between a sending time period of the interference frame and the sending time period of the frame is interference time. Further, the server may alternatively determine an interference frame of a station that sends the frame (that is, the interference frame of the frame determined in the foregoing procedure). The server may alternatively determine an interference source of a station that sends the frame (that is, the interference source of the frame determined in the foregoing procedure). The server may alternatively determine interference time of a station that sends the frame (that is, the interference time of the frame determined in the foregoing procedure).

This application provides the interference information detection method. The server collects the information about the plurality of frames from the plurality of stations. Information about some of the plurality of frames includes sending time, contention time, and frame duration, and the contention time indicates time at which a corresponding frame starts to wait to be sent or duration in which the corresponding frame waits to be sent. The server determines the interference information of the plurality of stations based on the information about the plurality of frames. The server collects the information about the plurality of frames from the plurality of stations, so that the server can analyze the interference information of the plurality of stations based on the information about the plurality of frames with a small granularity. This improves accuracy of the interference information. This feature accurately displays interference information of each station without affecting services, to improve current communication quality.

In an embodiment, the plurality of stations include a plurality of access points APs. Specifically, the server collects information about frames of a plurality of APs. For example, an application scenario is as follows: one server (or a plurality of servers) and a plurality of APs managed by the server. The server collects information about frames from the plurality of APs. Then, the server determines interference information of the plurality of APs based on the information about a plurality of frames. The server may actively collect information about a frame from the AP, or the AP may actively report information about a frame of the AP to the server.

In an embodiment, the plurality of stations include a plurality of access points APs and a plurality of non-AP stations. Specifically, the plurality of stations include: one AP and one non-AP station, or a plurality of APs and one non-AP station, or one AP and a plurality of non-AP stations, or a plurality of non-AP stations.

In an embodiment, the information about the plurality of frames further includes a second frame information set, and information about each frame in the second frame information set includes receiving time and frame duration. That the server determines the interference information of the plurality of stations based on the information about the plurality of frames includes: The server determines the interference information of the plurality of stations based on the first frame information set and the second frame information set.

Specifically, the first frame information set includes sending time (time), contention time, and frame duration (duration). The sending time is time at which the plurality of stations send the frames, and the contention time is time at which a corresponding frame starts to wait to be sent or duration in which the corresponding frame waits to be sent. That is, frames corresponding to the first frame information set are transmitted frames of the plurality of stations. For example, the duration in which the frame waits to be sent refers to a difference between time at which the frame starts to be sent and time at which the frame starts to wait to be sent. The time at which the frame starts to be sent is indicated by a sending timestamp (startTs) of the frame, and the time at which the frame starts to wait to be sent is indicated by a contention timestamp (startEdcaTs) of the frame. The duration in which the frame waits to be sent may be backoff (backoff) time. The second frame information set includes receiving time and frame duration. The receiving time is time at which the plurality of stations receive the frames. That is, frames corresponding to the second frame information set are received frames of the plurality of stations. The server may further collect information about the received frames, and determine the interference information of the plurality of stations based on the information about the received frames. This further improves accuracy of the interference information.

In an embodiment, a first frame set in the plurality of frames is sent by the plurality of APs, and a second frame set in the plurality of frames is sent by the non-AP station. The first frame set includes one or more frames in the plurality of frames, the second frame set includes one or more frames in the plurality of frames, and the frames included in the first frame set and the second frame set are not repeated. That the server collects the information about the plurality of frames from the plurality of stations includes: The server obtains information about the frame in the first frame set and information about the frame in the second frame set from the plurality of APs. Specifically, the server collects information about the frames of the plurality of APs and information about the frames of the plurality of non-AP stations from the plurality of APs. The information about the frames of the plurality of non-AP stations is collected by the AP stations from the non-AP stations and then transmitted to the server. That is, the AP station serves as a relay of the non-AP station, and transmits the information about the frame from the non-AP station to the server. In other words, the server collects the information about the frames in the first frame set and the information about the frames in the second frame set from the plurality of APs. The plurality of APs collect the information about the frames in the second frame set from the plurality of non-AP stations and forward the information to the server. In this solution, the server may directly collect the information about the frames of the APs and the information about the frames of the non-AP stations from the plurality of APs. This improves implementation flexibility of the solution.

In an embodiment, the plurality of stations include an AP and a non-AP station. A first frame set in the plurality of frames is sent by the plurality of APs, and a second frame set in the plurality of frames is sent by the non-AP station. The first frame set includes one or more frames in the plurality of frames, the second frame set includes one or more frames in the plurality of frames, and the frames included in the first frame set and the second frame set are not repeated. That the server collects the information about the plurality of frames from the plurality of stations includes: The server collects information about the frame in the first frame set from the AP, and collects information about the frame in the second frame set from the non-AP station. Specifically, the server collects information about the frames of the plurality of APs from the plurality of APs, and the server collects information about the frames of the plurality of non-AP stations from the plurality of non-AP stations. That is, the server collects information about respective frames from the AP station and the non-AP station. In other words, the server collects information about the frames in the first frame set from the plurality of APs, and the server collects information about the frames in the second frame set from the plurality of non-AP stations. In this solution, the server may separately collect information about the frames of the APs from the plurality of APs, and collect information about the frames of the non-AP stations from the plurality of non-AP stations. This improves implementation flexibility of the solution.

In an embodiment, that the server collects the information about the plurality of frames from the plurality of stations includes: The server collects information about the plurality of frames within an information-collecting time period from the plurality of stations. Specifically, the server collects the information about the plurality of frames within the information-collecting time period. For example, if the information-collecting time period is 30 seconds, the server collects the information about the plurality of frames within the information-collecting time period (30 seconds) from the plurality of stations. For another example, if the information-collecting time period is 15:00 to 15:05, the server collects the information about the plurality of frames within the information-collecting time period (15:00 to 15:05) from the plurality of stations. For still another example, if the information-collecting time period is every 5 minutes, the server periodically collects the information about the plurality of frames within the information-collecting time period (every 5 minutes) from the plurality of stations. It may be understood that the server may collect the information about the plurality of frames within the information-collecting time period from the plurality of stations in real time, or the server may collect, from the plurality of stations after a period of time, the information about the plurality of frames within the information-collecting time period. For example, each station stores the information about the plurality of frames within the information-collecting time period (every 5 minutes), and the server collects, from the plurality of stations every 30 minutes, information (including information about the plurality of frames within six information-collecting time periods) about the plurality of frames stored by the plurality of stations. The server has a plurality of manners of collecting the information about the plurality of frames. This improves implementation flexibility of the solution.

In an embodiment, the interference information includes one or more of the following: interference sources of at least one of the plurality of frames, interference time of at least one frame in the plurality of frames, an interference source proportion of at least one frame in the plurality of frames, an interference source sequence of at least one frame in the plurality of frames, interference sources of any station in the plurality of stations, interference time of any station in the plurality of stations, an interference source proportion of any station in the plurality of stations, an interference source sequence of any station in the plurality of stations, an interference time proportion of any station in the plurality of stations. Further, the interference source includes a waiting interference source and/or a concurrent interference source. The waiting interference source is a station that causes waiting interference to the at least one frame or any station, and the concurrent interference source is a station that causes concurrent interference to the at least one frame or any station. The waiting interference is that a transmitted frame of the interference source occupies waiting time of the at least one frame, or the waiting interference is that a transmitted frame of the interference source occupies waiting time of any transmitted frame of the any station. The concurrent interference is that frame duration of the at least one frame and frame duration of the transmitted frame of the interference source coincide or overlap, or the concurrent interference is that frame duration of the transmitted frame of the interference source and frame duration of any transmitted frame of the any station coincide or overlap.

Where the interference time of the at least one frame is time at which the at least one frame is interfered. Further, the interference time includes concurrent interference time and/or waiting interference time. The waiting interference time is time at which the at least one frame is subject to waiting interference or time at which the any station is subject to waiting interference, and the concurrent interference time is time at which the at least one frame is subject to concurrent interference or time at which the any station is subject to concurrent interference.

Where the interference source proportion of the at least one frame is a ratio of time of interference caused by any interference source to the at least one frame to a sum of time of interference caused by all the interference sources to the at least one frame. For example, a frame 1 of an AP 1 is used as an example. Waiting interference frames that cause waiting interference to the frame 1 of the AP 1 include a frame 2 of an AP 2 and a frame 1 of an AP 3. If duration (that is, the first time period) of waiting interference caused by the frame 2 of the AP 2 to the frame 1 of the AP 1 is 50 microseconds, and duration (that is, the first time period) of waiting interference caused by the frame 1 of the AP 3 to the frame 1 of the AP 1 is 30 microseconds, an interference source proportion of the frame 1 of the AP 1 includes AP 2 (37.5%) and AP 3 (62.5%).

Where the interference source sequence of the at least one frame is a result of sorting all interference sources based on interference time of the at least one frame.

For example, the AP 1 may be subject to concurrent interference and waiting interference from the AP 2. In this case, the interference sources of the AP 1 include the AP 2, and an interference source type of the AP 2 is waiting interference source and concurrent interference source.

Where the interference time of the any station is time at which the any station is interfered.

Where the interference source proportion of the any station is a ratio of time of interference caused by any interference source to the any station to a sum of time of interference caused by all interference sources to the any station;

Where the interference source sequence of the any station is a result of sorting all the interference sources based on the time of interference caused by all the interference sources on the any station; and Where the interference time proportion of the any station is a ratio of a sum of interference time of the at least one frame of the any station to the information-collecting time period, and the information-collecting time period is a time period in which the server collects the information about the plurality of frames from the plurality of stations.

It may be understood that the interference time proportion of any station may alternatively be a ratio of a sum of interference time of at least one frame of any station to a preset time period. The preset time period is a time period predefined by the user, and the preset time period may be inconsistent with the statistics time period. For example, the preset time period is 10 seconds, and the information-collecting time period is 5 seconds.

In an embodiment, the interference source includes the waiting interference source and/or the concurrent interference source. The waiting interference source is a station that causes waiting interference to the at least one frame or any station, and the concurrent interference source is a station that causes concurrent interference to the at least one frame or any station. The waiting interference is that a transmitted frame of the interference source occupies waiting time of the at least one frame, or the waiting interference is that a transmitted frame of the interference source occupies waiting time of any transmitted frame of the any station. The concurrent interference is that frame duration of the at least one frame and frame duration of a transmitted frame of the interference source coincide or overlap, or the concurrent interference is that frame duration of a transmitted frame of the interference source and a frame duration of any transmitted frame of the any station coincide or overlap. The interference time includes waiting interference time and/or concurrent interference time. The waiting interference time is time at which the at least one frame is subject to waiting interference or time at which the any station receives is subject to waiting interference, and the concurrent interference time is time at which the at least one frame is subject to interference concurrent or time at which the any station is subject to interference concurrent.

In an embodiment, the plurality of frames include a first frame and a second frame, the plurality of stations include a first station and a second station, the first station sends the first frame, and the second station sends the second frame. When sending time of the second frame is greater than waiting time of the first frame, and a sum of the sending time of the second frame and frame duration of the second frame is less than sending time of the first frame, the interference time includes waiting interference time of the first frame. The waiting interference time of the first frame is equal to contention time of the second frame.

In an embodiment, the plurality of frames include a first frame and a second frame, the plurality of stations include a first station and a second station, the first station sends the first frame, and the second station sends the second frame. When sending time of the second frame is greater than or equal to frame duration of the first frame, and contention time of the second frame is less than a sum of sending time of the first frame and the frame duration of the first frame, the interference time includes concurrent interference time of the first frame. The concurrent interference time of the first frame is equal to the contention time of the second frame.

In an embodiment, the interference time proportion of the any station in the plurality of stations includes waiting interference time proportion of the any station. The waiting interference time proportion is a ratio of waiting interference time of a transmitted frame of the any station to the information-collecting time period, the waiting interference time is a sum of backoff time of transmitted frames that are in the any station and on which waiting interference occurs, and the backoff time of the transmitted frame is equal to a difference between sending time of the transmitted frame and contention time of the transmitted frame.

For example, if waiting interference time of any station is 1000 microseconds, and the information-collecting time period is 10 seconds, the waiting interference time proportion is 1%. In another example, the AP 1 is used as an example. If waiting interference time of the AP 2 to the AP 1 is 100 microseconds, and the information-collecting time period is 10 seconds, a waiting interference time proportion of the AP 2 to the AP 1 is 0.1%. If waiting interference time of the AP 3 to the AP 1 is 500 microseconds, and the information-collecting time period is 10 seconds, a waiting interference time proportion of the AP 3 to the AP 1 is 0.5%.

In an embodiment, the interference source proportion of the at least one frame in the plurality of frames includes a waiting interference source proportion of the at least one frame, where the waiting interference source proportion is a ratio of a first time period to a plurality of first time periods, the first time period is an overlapping time period between frame duration of any waiting interference frame and backoff time of a transmitted frame, the waiting interference frame is a frame that causes waiting interference to the transmitted frame, and the plurality of first time periods are a sum of first time periods of all waiting interference frames that cause waiting interference to the transmitted frame.

For example, the frame 1 of the AP 1 is used as an example. The waiting interference frames that cause waiting interference to the frame 1 of the AP 1 include the frame 2 of the AP 2 and the frame 1 of the AP 3. If the duration (that is, the first time period) of waiting interference caused by the frame 2 of the AP 2 to the frame 1 of the AP 1 is 50 microseconds, and the duration (that is, the first time period) of waiting interference caused by the frame 1 of the AP 3 to the frame 1 of the AP 1 is 30 microseconds, the interference source proportion of the frame 1 of the AP 1 includes AP 2 (37.5%) and AP 3 (62.5%).

In an embodiment, the interference time proportion of the any station in the plurality of stations includes a concurrent interference time proportion of the any station. The concurrent interference time proportion of the any station is a ratio of concurrent interference time of a transmitted frame of the any station to the information-collecting time period, and the concurrent interference time is frame duration of the transmitted frame that is in the any station and on which concurrent interference occurs.

For example, if concurrent interference time of any station is 500 microseconds, and the information-collecting time period is 10 seconds, the concurrent interference time proportion is 0.5%. In another example, the AP 1 is used as an example. If concurrent interference time of the AP 2 to the AP 1 is 100 microseconds, and the information-collecting time period is 10 seconds, a concurrent interference time proportion of the AP 2 to the AP 1 is 0.1%. If concurrent interference time of the AP 3 to the AP 1 is 500 microseconds, and the information-collecting time period is 10 seconds, a concurrent interference time proportion of the AP 3 to the AP 1 is 0.5%.

In an embodiment, the interference source proportion of the at least one frame in the plurality of frames includes a concurrent interference source proportion of the at least one frame. The concurrent interference source proportion is a ratio of a second time period to a plurality of second time periods, the second time period is frame duration of any concurrent interference frame, the concurrent interference frame is a frame that causes concurrent interference to a transmitted frame of the any station, and the plurality of second time periods are a sum of frame duration of all concurrent interference frames that cause concurrent interference to the transmitted frame.

For example, the frame 1 of the AP 1 is used as an example. The concurrent interference frames that cause concurrent interference to the frame 1 of the AP1 include the frame 2 of the AP 2 and the frame 1 of the AP 3. If duration (that is, the second time period) of concurrent interference caused by the frame 2 of the AP 2 to the frame 1 of the AP 1 is 50 microseconds, and duration (that is, the second time period) of concurrent interference caused by the frame 1 of the AP 3 to the frame 1 of the AP 1 is 30 microseconds, the interference source proportion of the frame 1 of the AP 1 includes AP 2 (37.5%) and AP 3 (62.5%).

In an embodiment, the information about at least one of the plurality of frames further includes one or more of the following: a frame type of the at least one frame, a frame subtype of the at least one frame, an uplink identifier or a downlink identifier of the at least one frame, a source address of the at least one frame, a destination address of the at least one frame, or an identifier indicating whether the at least one frame is successfully transmitted.

For example, the frame type of the at least one frame includes but is not limited to a control frame (Ctrl) type, a management frame (Mgmt) type, or a data frame (Data) type.

For example, the frame subtype of the at least one frame includes but is not limited to a request to send (RTS) frame subtype, a clear to send frame subtype, a Block Acknowledgment (BA) frame subtype, an acknowledgment (ACK) frame subtype, or a QoS data (quality of service data) frame subtype.

For example, when the frame is a transmitted frame, the information about the frame includes the destination address of the frame. When the frame is a received frame, the information about the frame includes the source address of the frame.

For example, when the frame is an uplink frame (that is, a frame sent by the non-AP station to the AP), the frame includes the uplink identifier. For example, a field of the frame is "1", and the field "1" indicates that the frame is an uplink frame. When the frame is a downlink frame (that is, a frame sent by the AP to the non-AP station), the frame includes the downlink identifier. For example, a field of the frame is "0", and the field "0" indicates that the frame is a downlink frame.

According to a second aspect, this application proposes a communication apparatus. The communication apparatus is applied to a server and includes:

a transceiver module, configured to collect information about a plurality of frames from a plurality of stations, where the information about the plurality of frames includes a first frame information set, information about each frame in the first frame information set includes sending time, contention time, and frame duration, and the contention time indicates time at which a corresponding frame starts to wait to be sent or duration in which the corresponding frame waits to be sent; and a processing module, configured to determine interference information of the plurality of stations based on the information about the plurality of frames.

In an embodiment, the plurality of stations include a plurality of access points APs.

In an embodiment, the information about the plurality of frames further includes a second frame information set, and information about each frame in the second frame information set includes receiving time and frame duration.

The processing module is further configured to determine the interference information of the plurality of stations based on the first frame information set and the second frame information set.

In an embodiment, a first frame set in the plurality of frames is sent by the plurality of APs, and a second frame set in the plurality of frames is sent by a non-AP station. The first frame set includes one or more frames in the plurality of frames, the second frame set includes one or more frames in the plurality of frames, and the frames included in the first frame set and the second frame set are not repeated.

The processing module is further configured to obtain information about a frame in the first frame set and information about a frame in the second frame set from the plurality of APs.

In an embodiment, the plurality of stations include an AP and a non-AP station.

A first frame set in the plurality of frames is sent by the AP, and a second frame set in the plurality of frames is sent by the non-AP station. The first frame set includes one or more frames in the plurality of frames, the second frame set includes one or more frames in the plurality of frames, and the frames included in the first frame set and the second frame set are not repeated.

The processing module is further configured to collect information about a frame in the first frame set from the AP, and the server collects information about a frame in the second frame set from the non-AP station.

In an embodiment, the processing module is further configured to collect information about the plurality of frames within an information-collecting time period from the plurality of stations.

In an embodiment, the interference information includes one or more of the following items:
  interference sources of at least one of the plurality of frames;
  interference time of at least one frame in the plurality of frames, where the interference time of the at least one frame is time at which the at least one frame is interfered;
  an interference source proportion of at least one frame in the plurality of frames, where the interference source proportion of the at least one frame is a ratio of time of interference caused by any interference source to the at least one frame to a sum of time of interference caused by all the interference sources to the at least one frame;
  an interference source sequence of at least one frame in the plurality of frames, where the interference source sequence of the at least one frame is a result of sorting all interference sources based on the time interference of the at least one frame;
  interference sources of any station in the plurality of stations.
  interference time of any station in the plurality of stations, where the interference time of the any station is time at which the any station is interfered;
  an interference source proportion of any station in the plurality of stations, where the interference source proportion of the any station is a ratio of time of interference caused by any interference source to the any station to a sum of time of interference caused by all the interference sources to the any station;
  an interference source sequence of any station in the plurality of stations, where the interference source sequence of the any station is a result of sorting all the interference sources based on the time of interference caused by all the interference sources on the any station; and
  an interference time proportion of any station in the plurality of stations, where the interference time proportion of the any station is a ratio of a sum of interference time of the at least one frame of the any station to the information-collecting time period, and the information-collecting time period is a time period in which the server collects the information about the plurality of frames from the plurality of stations.

In an embodiment, the interference source includes a waiting interference source and/or a concurrent interference source. The waiting interference source is a station that causes waiting interference to the at least one frame or any station, and the concurrent interference source is a station that causes concurrent interference to the at least one frame or any station.

The waiting interference is that a transmitted frame of the interference source occupies waiting time of the at least one frame, or the waiting interference is that a transmitted frame of the interference source occupies waiting time of any transmitted frame of the any station.

The concurrent interference is that frame duration of the at least one frame and frame duration of a transmitted frame of the interference source coincide or overlap, or the concurrent interference is that frame duration of a transmitted frame of the interference source and frame duration of any transmitted frame of the any station coincide or overlap.

The interference time includes waiting interference time and/or concurrent interference time. The waiting interference time is time at which the at least one frame is subject to waiting interference or time at which the any station is subject to waiting interference, and the concurrent interference time is time at which the at least one frame is subject to concurrent interference or time at which the any station is subject to concurrent interference.

In an embodiment, the plurality of frames include the first frame and the second frame, the plurality of stations include a first station and a second station, the first station sends the first frame, and the second station sends the second frame.

When sending time of the second frame is greater than waiting time of the first frame, and a sum of the sending time of the second frame and frame duration of the second frame is less than the sending time of the first frame, the interference time includes:
  waiting interference time of the first frame, where the waiting interference time of the first frame is equal to contention time of the second frame.

In an embodiment, the plurality of frames include a first frame and a second frame, the plurality of stations include a first station and a second station, the first station sends the first frame, and the second station sends the second frame.

When sending time of the second frame is greater than or equal to frame duration of the first frame, and contention time of the second frame is less than a sum of sending time of the first frame and the frame duration of the first frame, the interference time includes:
  concurrent interference time of the first frame, where the concurrent interference time of the first frame is equal to the contention time of the second frame.

In an embodiment, the interference time proportion of the any station in the plurality of stations includes:

waiting interference time proportion of the any station, where the waiting interference time proportion is a ratio of waiting interference time of a transmitted frame of the any station to the information-collecting time period, the waiting interference time is a sum of backoff time of transmitted frames that are in the any station and on which waiting interference occurs, and the backoff time of the transmitted frame is equal to a difference between sending time of the transmitted frame and contention time of the transmitted frame.

In an embodiment, the interference source proportion of the at least one frame in the plurality of frames includes:

waiting interference source proportion of the at least one frame, where the waiting interference source proportion is a ratio of a first time period to a plurality of first time periods, the first time period is an overlapping time period between frame duration of any waiting interference frame and backoff time of a transmitted frame, the waiting interference frame is a frame that causes waiting interference to the transmitted frame, and the plurality of first time periods are a sum of first time periods of all waiting interference frames that cause waiting interference to the transmitted frame.

In an embodiment, the interference time proportion of the any station in the plurality of stations includes:

a concurrent interference time proportion of the any station, where the concurrent interference time proportion of the any station is a ratio of concurrent interference time of a transmitted frame of the any station to the information-collecting time period, and the concurrent interference time is frame duration of the transmitted frame that is in the any station and on which concurrent interference occurs.

In an embodiment, the interference source proportion of the at least one frame in the plurality of frames includes:

a concurrent interference source proportion of the at least one frame, where the concurrent interference source proportion is a ratio of a second time period to a plurality of second time periods, the second time period is frame duration of any concurrent interference frame, the concurrent interference frame is a frame that causes concurrent interference to a transmitted frame of the any station, and the plurality of second time periods are a sum of frame duration of all concurrent interference frames that cause concurrent interference to the transmitted frame.

In an embodiment, the information about at least one of the plurality of frames further includes one or more of the following items:

a frame type of the at least one frame, a frame subtype of the at least one frame, an uplink identifier or a downlink identifier of the at least one frame, a source address of the at least one frame, a destination address of the at least one frame, or an identifier indicating whether the at least one frame is successfully transmitted.

According to a third aspect, this application proposes a communication apparatus. The communication apparatus is applied to a server and includes:

a transceiver, configured to collect information about a plurality of frames from a plurality of stations, where the information about the plurality of frames includes a first frame information set, information about each frame in the first frame information set includes sending time, contention time, and frame duration, and the contention time indicates time at which a corresponding frame starts to wait to be sent or duration in which the corresponding frame waits to be sent; and a processor, configured to determine interference information of the plurality of stations based on the information about the plurality of frames.

In an embodiment, the plurality of stations include a plurality of access points APs.

In an embodiment, the information about the plurality of frames further includes a second frame information set, and information about each frame in the second frame information set includes receiving time and frame duration.

The processor is further configured to determine the interference information of the plurality of stations based on the first frame information set and the second frame information set.

In an embodiment, a first frame set in the plurality of frames is sent by the plurality of APs, and a second frame set in the plurality of frames is sent by a non-AP station. The first frame set includes one or more frames in the plurality of frames, the second frame set includes one or more frames in the plurality of frames, and the frames included in the first frame set and the second frame set are not repeated.

The processor is further configured to obtain information about a frame in the first frame set and information about a frame in the second frame set from the plurality of APs.

In an embodiment, the plurality of stations include an AP and a non-AP station.

A first frame set in the plurality of frames is sent by the AP, and a second frame set in the plurality of frames is sent by the non-AP station. The first frame set includes one or more frames in the plurality of frames, the second frame set includes one or more frames in the plurality of frames, and the frames included in the first frame set and the second frame set are not repeated.

The processor is further configured to collect information about a frame in the first frame set from the AP, and the server collects information about a frame in the second frame set from the non-AP station.

In an embodiment, the processor is further configured to collect information about the plurality of frames within an information-collecting time period from the plurality of stations.

In an embodiment, the interference information includes one or more of the following items:

interference sources of at least one of the plurality of frames;

interference time of at least one frame in the plurality of frames, where the interference time of the at least one frame is time at which the at least one frame is interfered;

an interference source proportion of at least one frame in the plurality of frames, where the interference source proportion of the at least one frame is a ratio of time of interference caused by any interference source to the at least one frame to a sum of time of interference caused by all the interference sources to the at least one frame;

an interference source sequence of at least one frame in the plurality of frames, where the interference source sequence of the at least one frame is a result of sorting all interference sources based on the interference time of the at least one frame;

interference sources of any station in the plurality of stations;

interference time of any station in the plurality of stations, where the interference time of the any station is time at which the any station is interfered;

an interference source proportion of any station in the plurality of stations, where the interference source proportion of the any station is a ratio of time of interference caused by any interference source to the any station to a sum of time of interference caused by all the interference sources to the any station;

an interference source sequence of any station in the plurality of stations, where the interference source sequence of the any station is a result of sorting all the interference sources based on the time of interference caused by all the interference sources on the any station; and an interference time proportion of any station in the plurality of stations, where the interference time proportion of the any station is a ratio of a sum of interference time of the at least one frame of the any station to the information-collecting time period, and the information-collecting time period is a time period in which the server collects the information about the plurality of frames from the plurality of stations.

In an embodiment, the interference source includes a waiting interference source and/or a concurrent interference source. The waiting interference source is a station that causes waiting interference to the at least one frame or any station, and the concurrent interference source is a station that causes concurrent interference to the at least one frame or any station.

The waiting interference is that a transmitted frame of the interference source occupies waiting time of the at least one frame, or the waiting interference is that a transmitted frame of the interference source occupies waiting time of any transmitted frame of the any station.

The concurrent interference is that frame duration of the at least one frame and frame duration of a transmitted frame of the interference source coincide or overlap, or the concurrent interference is that frame duration of a transmitted frame of the interference source and frame duration of any transmitted frame of the any station coincide or overlap.

The interference time includes waiting interference time and/or concurrent interference time. The waiting interference time is time at which the at least one frame is subject to waiting interference or time at which the any station is subject to waiting interference, and the concurrent interference time is time at which the at least one frame is subject to concurrent interference or time at which the any station is subject to concurrent interference.

In an embodiment, the plurality of frames include a first frame and a second frame, the plurality of stations include a first station and a second station, the first station sends the first frame, and the second station sends the second frame.

When sending time of the second frame is greater than waiting time of the first frame, and a sum of the sending time of the second frame and frame duration of the second frame is less than the sending time of the first frame, the interference time includes:

waiting interference time of the first frame, where the waiting interference time of the first frame is equal to contention time of the second frame.

In an embodiment, the plurality of frames include a first frame and a second frame, the plurality of stations include a first station and a second station, the first station sends the first frame, and the second station sends the second frame.

When sending time of the second frame is greater than or equal to frame duration of the first frame, and contention time of the second frame is less than a sum of sending time of the first frame and the frame duration of the first frame, the interference time includes:

concurrent interference time of the first frame, where the concurrent interference time of the first frame is equal to the contention time of the second frame.

In an embodiment, the interference time proportion of the any station in the plurality of stations includes:

waiting interference time proportion of the any station, where the waiting interference time proportion is a ratio of waiting interference time of a transmitted frame of the any station to the information-collecting time period, the waiting interference time is a sum of backoff time of transmitted frames that are in the any station and on which waiting interference occurs, and the backoff time of the transmitted frame is equal to a difference between sending time of the transmitted frame and contention time of the transmitted frame.

In an embodiment, the interference source proportion of the at least one frame in the plurality of frames includes:

a waiting interference source proportion of the at least one frame, where the waiting interference source proportion is a ratio of a first time period to a plurality of first time periods, the first time period is an overlapping time period between frame duration of any waiting interference frame and backoff time of a transmitted frame, the waiting interference frame is a frame that causes waiting interference to the transmitted frame, and the plurality of first time periods are a sum of first time periods of all waiting interference frames that cause waiting interference to the transmitted frame.

In an embodiment, the interference time proportion of the any station in the plurality of stations includes:

a concurrent interference time proportion of the any station, where the concurrent interference time proportion of the any station is a ratio of concurrent interference time of a transmitted frame of the any station to the information-collecting time period, and the concurrent interference time is frame duration of the transmitted frame that is in the any station and on which concurrent interference occurs.

In an embodiment, the interference source proportion of the at least one frame in the plurality of frames includes:

a concurrent interference source proportion of the at least one frame, where the concurrent interference source proportion is a ratio of a second time period to a plurality of second time periods, the second time period is frame duration of any concurrent interference frame, the concurrent interference frame is a frame that causes concurrent interference to a transmitted frame of the any station, and the plurality of second time periods are a sum of frame duration of all concurrent interference frames that cause concurrent interference to the transmitted frame.

In an embodiment, the information about at least one of the plurality of frames further includes one or more of the following items:

a frame type of the at least one frame, a frame subtype of the at least one frame, an uplink identifier or a downlink identifier of the at least one frame, a source address of the at least one frame, a destination address of the at least one frame, or an identifier indicating whether the at least one frame is successfully transmitted.

According to a fourth aspect, a communication apparatus is provided, to implement the foregoing methods. The communication apparatus may be the server in the first aspect, or an apparatus including the server, or an apparatus included in the server, for example, a system chip. The communication apparatus includes a corresponding module, unit, or means for implementing the foregoing method. The module, unit, or means may be implemented by using hardware or software, or implemented by using hardware by executing corresponding software. The hardware or the software includes one or more modules or units corresponding to the foregoing functions.

According to a fifth aspect, a communication apparatus is provided. The communication apparatus includes a processor and a memory. The memory is configured to store computer instructions. When the processor executes the instructions, the communication apparatus is enabled to perform the method according to any one of the foregoing aspects. The communication apparatus may be the server in the first aspect, or an apparatus including the server, or an apparatus included in the server, for example, a system chip.

According to a sixth aspect, a communication apparatus is provided, including a processor. The processor is configured to: after being coupled to a memory and reading instructions in the memory, perform the method in any one of the foregoing aspects based on the instructions. The memory and the communication apparatus are independent of each other. The communication apparatus may be the server in the first aspect, or an apparatus including the server, or an apparatus included in the server, for example, a system chip.

According to a seventh aspect, a computer-readable storage medium is provided. The computer-readable storage medium stores instructions. When the instructions are executed on a communication apparatus, the communication apparatus is enabled to perform the method according to any one of the foregoing aspects. The communication apparatus may be the server in the first aspect, or an apparatus including the server, or an apparatus included in the server, for example, a system chip.

According to an eighth aspect, a computer program product including instructions is provided. When the instructions are run on a communication apparatus, the communication apparatus is enabled to perform the method according to any one of the foregoing aspects. The communication apparatus may be the server in the first aspect, or an apparatus including the server, or an apparatus included in the server, for example, a system chip.

According to a ninth aspect, a communication apparatus is provided (for example, the communication apparatus may be a chip or a chip system). The communication apparatus includes a processor, configured to implement a function according to any one of the foregoing aspects. In a possible design, the communication apparatus further includes the memory, and the memory is configured to store necessary program instructions and data. When the communication apparatus is a chip system, the communication apparatus may include a chip, or may include a chip and another discrete component.

According to a tenth aspect, a chip is provided. The chip includes a processor and a communication interface. The communication interface is configured to communicate with a module other than the shown chip. The processor is configured to run a computer program or instructions, so that an apparatus in which the chip is installed can perform the method according to any one of the foregoing aspects.

According to an eleventh aspect, a communication system is provided. The communication system includes the server in the foregoing aspects and a plurality of APs. The server is configured to collect information about a plurality of frames of the plurality of APs. The server determines interference information of the plurality of APs based on the information about the plurality of frames of the plurality of APs.

According to a twelfth aspect, a communication system is provided. The communication system includes the server in the foregoing aspects and a plurality of non-AP stations. The server is configured to collect information about a plurality of frames of the plurality of non-AP stations. The server determines interference information about the plurality of non-AP stations based on the information about the plurality of frames of the plurality of non-AP stations.

According to a thirteenth aspect, a communication system is provided. The communication system includes the server in the foregoing aspects, a plurality of APs, and a plurality of non-AP stations. The server is configured to collect information about a plurality of frames of the plurality of APs and information about a plurality of frames of the plurality of non-AP stations. The server determines interference information of the plurality of APs and the plurality of non-AP stations based on the information about the plurality of frames of the plurality of APs and the information about the plurality of frames of the plurality of non-AP stations.

DESCRIPTION OF EMBODIMENTS

The following describes embodiments of this application. It is clearly that described embodiments are merely some but not all of embodiments of this application. A person of ordinary skill in the art may learn that, as a new application scenario emerges, the technical solutions provided in embodiments of this application are also applicable to a similar technical problem.

In the specification, claims, and accompanying drawings of this application, the terms "first", "second", and so on are intended to distinguish between similar objects but do not necessarily indicate a specific order or sequence. It should be understood that the descriptions termed in such a manner are interchangeable in proper cases so that embodiments can be implemented in another order than the order illustrated or described in this application. Names or numbers of operations in this application do not mean that the operations in the method procedure need to be performed in a time/logical sequence indicated by the names or numbers. An execution order of the operations in the procedure that have been named or numbered can be changed based on a technical objective to be achieved, provided that same or similar technical effects can be achieved.

Embodiments of this application may be applied to a wireless local area network (WLAN). Currently, a standard used in the WLAN is the Institute of Electrical and Electronics Engineers (IEEE) 802.11 family. The WLAN may include a plurality of basic service sets (BSSs). A network node in the basic service set is a station (STA). The station includes an access point (AP) and a non-access point station (non-AP STA). Each basic service set may include one AP and a plurality of non-AP STAs associated with the AP.

The access point is also referred to as a hotspot. The AP is a device used by a mobile user to access a wired network, and can be deployed at home, inside a building, inside a campus, or outdoors. A typical coverage radius of the AP is tens of meters to hundreds of meters. The AP is equivalent to a bridge that connects another network (for example, a wired network or a cellular mobile network) and the WLAN. The AP is mainly configured to connect wireless network clients to each other, and then connect a wireless network to the Ethernet. Specifically, the AP may be a terminal device or a network device with a WLAN chip.

The non-access point station may be a wireless communication chip, a wireless sensor, or a wireless communication terminal, for example, a mobile phone supporting a WLAN communication function, a tablet computer supporting a WLAN communication function, a set top box supporting a WLAN communication function, a smart TV supporting a WLAN communication function, a smart wearable device supporting a WLAN communication function, an in-vehicle communication device supporting a WLAN communication function, or a computer supporting a WLAN communication function.

Figure 1:
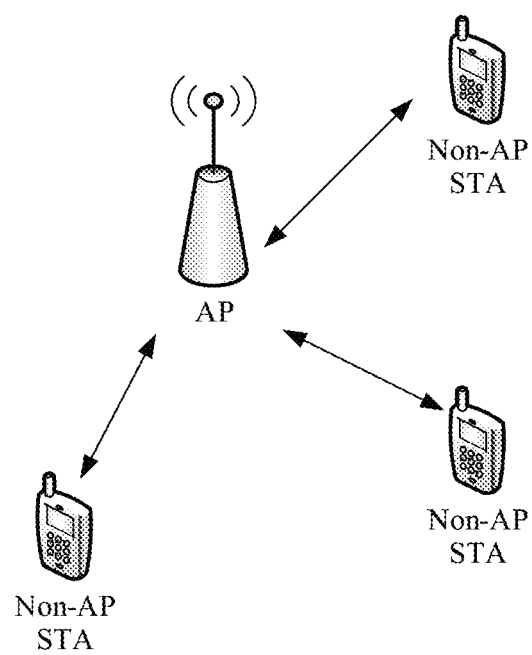
FIG. 1 is a schematic diagram of an architecture of a communication system according to an embodiment of this application.

For example, embodiments of this application are applicable to a scenario in which the AP communicates with the non-AP STA in the WLAN. In an embodiment, the AP may communicate with a single non-AP STA, or the AP communicates with a plurality of non-AP STAs. For example, FIG. 1 is a schematic diagram of an architecture of a communication system according to an embodiment of this application. FIG. 1 shows one AP and three non-AP STAs.

A method provided in this application may also be applied to various wireless communication systems that use a carrier sense multiple access (CSMA) mechanism, for example, a Bluetooth (Bluetooth) system, a ZigBee (ZigBee) system, or a cellular mobile network system that uses an unlicensed frequency band, or may be applied to wireless communication systems such as an Internet of Things (IoT) system or a Narrowband Internet of Things (NB-IoT) system. This is not limited in embodiments of this application.

Figure 2:
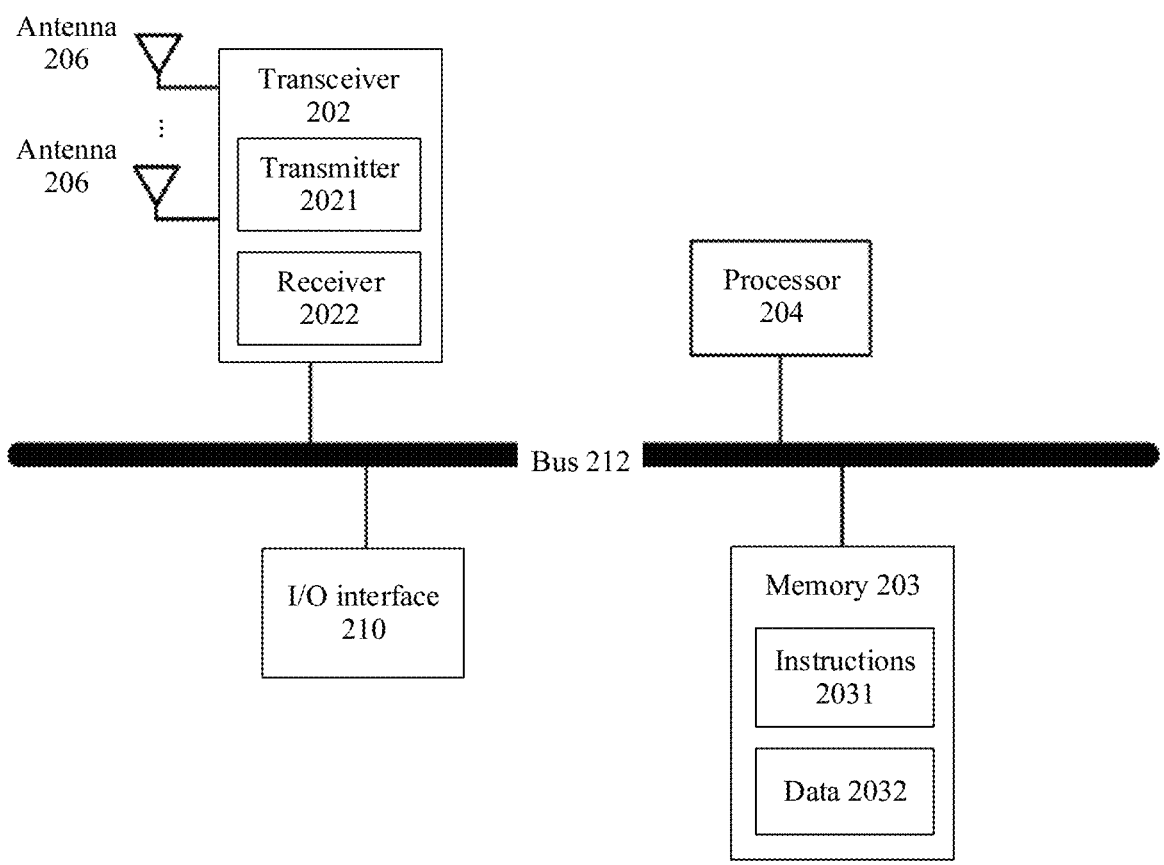
FIG. 2 is a schematic diagram of a hardware structure of a communication apparatus according to an embodiment of this application.

FIG. 2 is a schematic diagram of a hardware structure of a communication apparatus according to an embodiment of this application. The communication apparatus may be a possible implementation of an access point, a non-access point station, and/or a server in embodiments of this application. As shown in FIG. 2, the communication apparatus includes at least a processor 204, a memory 203, and a transceiver 202. The memory 203 is further configured to store instructions 2031 and data 2032. In an embodiment, the communication apparatus may further include antennas 206, an I/O (input/output) interface 210, and a bus 212. The transceiver 202 may include a transmitter 2021 and a receiver 2022. In addition, the processor 204, the transceiver 202, the memory 203, and the I/O interface 210 may be communicatively connected to each other through the bus 212, and the antenna 206 is connected to the transceiver 202.

The processor 204 may be a general purpose processor, for example, but not limited to a central processing unit (CPU), or may be a dedicated processor, for example, but not limited to a digital signal processor DSP, an application-specific integrated circuit (ASIC), and a field programmable gate array (FPGA). Alternatively, the processor 204 may be a neural network processing unit (NPU). In addition, the processor 204 may alternatively be a combination of a plurality of processors. Particularly, in the technical solutions provided in embodiments of this application, the processor 204 may be configured to perform related operations in subsequent method embodiments. The processor 204 may be a processor that is specially designed to perform the foregoing steps and/or operations, or may be a processor that performs the foregoing steps and/or operations by reading and executing the instructions 2031 stored in the memory 203. The processor 204 may need to use the data 2032 in a process of performing the foregoing steps and/or operations.

The transceiver 202 includes the transmitter 2021 and the receiver 2022. In an optional implementation, the transmitter 2021 is configured to send a signal by using the antenna 206. The receiver 2022 is configured to receive a signal by using at least one of the antennas 206. Particularly, in the technical solutions provided in embodiments of this application, the transmitter 2021 may be specifically configured to perform, by using at least one of the antennas 206, for example, an operation performed by a receiving module or a sending module in the access point, the non-access point station, and/or the server when subsequent method embodiments are applied to the access point, the non-access point station, and/or the server.

In this embodiment of this application, the transceiver 202 is configured to support the communication apparatus in performing the foregoing receiving function and sending function. A processor having a processing function is considered as the processor 204. The receiver 2022 may also be referred to as an input port, a receiver circuit, or the like. The transmitter 2021 may be referred to as a transmitter, a transmitter circuit, or the like.

The processor 204 may be configured to execute the instructions stored in the memory 203, to control the transceiver 202 to receive a message and/or send a message, to complete functions of the communication apparatus in the method embodiments of this application. In an implementation, it may be considered that a function of the transceiver unit 202 is implemented by using a transceiver circuit or a dedicated transceiver chip. In this embodiment of this application, that the transceiver 202 receives a message may be understood as that the transceiver 202 inputs a message, and that the transceiver 202 sends a message may be understood as that the transceiver 202 outputs a message.

The memory 203 may be various types of storage media, for example, a random access memory (RAM), a read-only memory (ROM), a non-volatile RAM (NVRAM), a programmable ROM (PROM), an erasable PROM (EPROM), an electrically erasable PROM (EEPROM), a flash memory, an optical memory, and a register. The memory 203 is specifically configured to store the instructions 2031 and the data 2032. The processor 204 may perform the steps and/or the operations in the method embodiments of this application by reading and executing the instructions 2031 stored in the memory 203. The data 2032 may need to be used in a process of performing the operations and/or the steps in the method embodiments of this application.

In an embodiment, the communication apparatus may further include the I/O interface 210. The I/O interface 210 is configured to receive instructions and/or data from a peripheral device, and output instructions and/or data to the peripheral device.

In a WLAN, a quantity of access points (AP) and a quantity of non-access point stations (non-AP stations) are increasing. Therefore, interference between different access points and/or non-access point stations becomes more severe, and in particular, co-channel interference becomes more severe. This affects a data throughput and user experience.

Currently, a cause of interference to the AP and/or the non-AP station is usually detected through channel scanning-based interference information detection. The AP is used as an example. Specifically, the AP scans a signal of a neighboring AP to obtain a service set identifier (SSID) and a received signal strength indication (RSSI) of the neighboring AP at the same channel as the AP, and constructs a network topology of the co-channel APs. When the RSSI of the neighboring AP is greater than a threshold, the neighboring AP is considered as an interfering AP. Only interfering APs can be determined through the foregoing interference information detection, and a detection granularity (the granularity is an AP of level 1) of interference information is large. Consequently, how interference affects performance of the AP cannot be accurately described. Based on this, an embodiment of this application provides an interference information detection method. A server collects information about a plurality of frames from a plurality of stations. Information about some of the plurality of frames includes sending time, contention time, and frame duration, and the contention time indicates time at which a corresponding frame starts to wait to be sent or duration in which the corresponding frame waits to be sent. The server determines interference information of the plurality of stations based on the information about the plurality of frames. The server collects the information about the plurality of frames from the plurality of stations, so that the server can analyze the interference information of the plurality of stations based on the information about the plurality of frames with a small granularity. This improves accuracy of the interference information. This feature accurately displays interference information of each station without affecting services, to improve current communication quality.

The following describes a method part in embodiments of this application. First, a plurality of application scenarios to which embodiments of this application are applicable are described.

Figure 3:
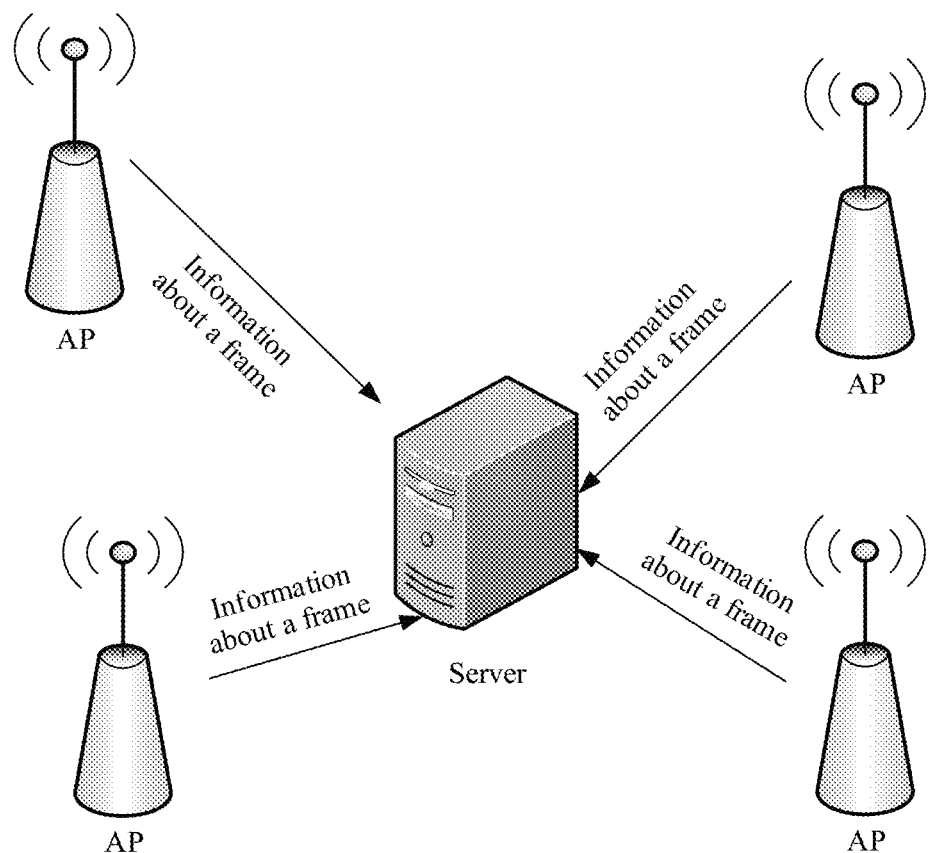
FIG. 3 is a schematic diagram of an application scenario according to an embodiment of this application.

In an example, the server collects information about frames of a plurality of APs. FIG. 3 is a schematic diagram of an application scenario according to an embodiment of this application. The application scenario shown in FIG. 3 includes one server (or may include a plurality of servers) and a plurality of APs managed by the server. The server collects information about frames from the plurality of APs. Then, the server determines interference information of the plurality of APs based on the information about a plurality of frames. The server may actively collect information about a frame from the AP, or the AP may actively report information about a frame of the AP to the server.

In an embodiment, time synchronization may be performed between APs, to reduce a clock offset between different APs.

In an embodiment, the server may also collect clock signals of different APs, and then determine a difference between the clock signal of the AP and a standard clock signal. Finally, the server calibrates information about a frame from the AP based on the difference. For example, if the server determines that a difference between an AP 1 and the standard clock signal is +500 milliseconds, and the server determines that a difference between an AP 2 and the standard clock signal is −500 milliseconds, the server determines that a clock offset between the AP 1 and the AP 2 is 1000 milliseconds. The server calibrates information about a frame from the AP 1 and information about a frame from the AP 2 based on the clock offset, to ensure accuracy of the information about the frame.

Figure 4:
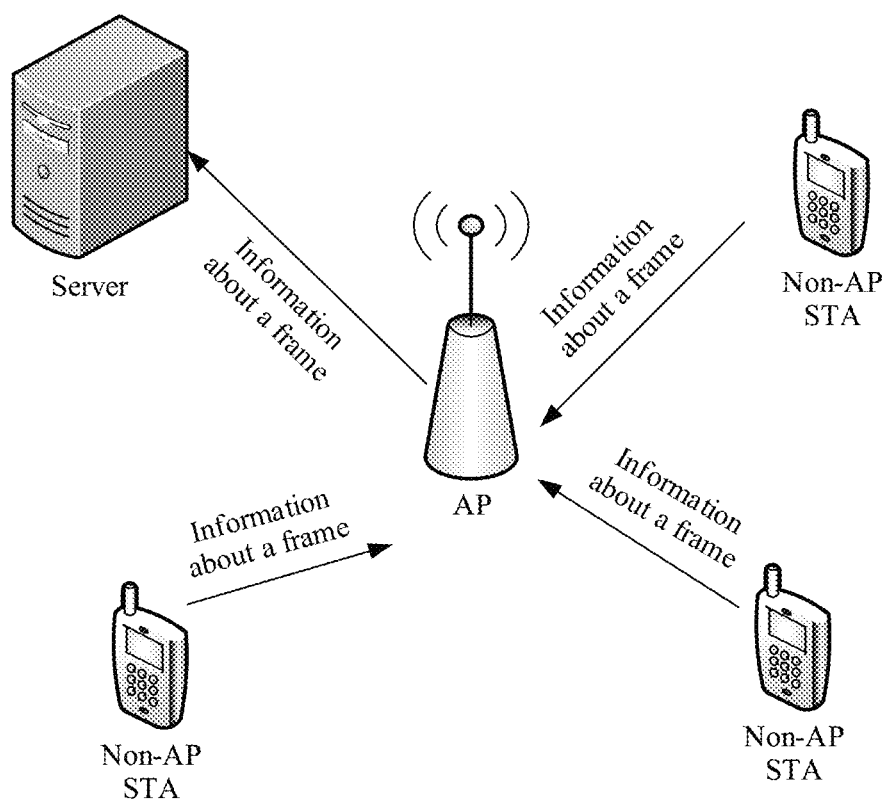
FIG. 4 is a schematic diagram of another application scenario according to an embodiment of this application.

In another example, the server may collect information about frames of a plurality of APs and information about frames of a plurality of non-AP stations. FIG. 4 is a schematic diagram of another application scenario according to an embodiment of this application. The application scenario shown in FIG. 4 includes one server (or may include a plurality of servers), a plurality of APs managed by the server (only one AP is shown in FIG. 4), and a plurality of non-AP stations managed by the plurality of APs (only a plurality of non-AP stations managed by one AP is shown in FIG. 4). Specifically, that the server collects information about frames of a plurality of APs and information about frames of a plurality of non-AP stations includes: The server obtains information about frames of the APs from the APs and information about frames of the non-AP stations managed by (or connected to) the APs. The AP may actively obtain the information about the frame of the non-AP station, and the non-AP station may also actively send the information about the frame of the non-AP station to the AP.

The AP may process information about the frame from the non-AP station, and then send processed information to the server. The AP may alternatively transparently transmit the information about the frame from the non-AP station. In other words, after receiving the information about the frame from the non-AP station, the AP directly forwards the information about the frame from the non-AP station to the server.

In an embodiment, time synchronization may be performed between APs, to reduce a clock offset between different APs.

In an embodiment, time synchronization may be performed between non-AP stations, to reduce a clock offset between different non-AP stations.

In an embodiment, time synchronization may be performed between the AP and the non-AP station, to reduce a clock offset between the AP and the non-AP station.

In an embodiment, the AP may alternatively collect clock signals of different non-AP stations, and then determine an offset between the clock signal of the non-AP station and the standard clock signal. Finally, the AP calibrates the information about the frame from the non-AP station based on the difference. For example, if the AP determines that a difference between a non-AP station 1 and the standard clock signal is +500 milliseconds, and the AP determines that a difference between a non-AP station 2 and the standard clock signal is −500 milliseconds, the AP determines that a clock offset between the non-AP station 1 and the non-AP station 2 is 1000 milliseconds. The AP calibrates information about a frame from the non-AP station 1 and information about a frame from the non-AP station 2 based on the clock offset, to ensure accuracy of the information about the frame.

In an embodiment, the server may alternatively collect clock signals of different APs and/or non-AP stations, and then determine a difference between the clock signal of the AP and/or non-AP station and the standard clock signal. Finally, the server calibrates information about a frame from the AP and/or non-AP station based on the difference, to ensure accuracy of the information about the frame.

Figure 5:
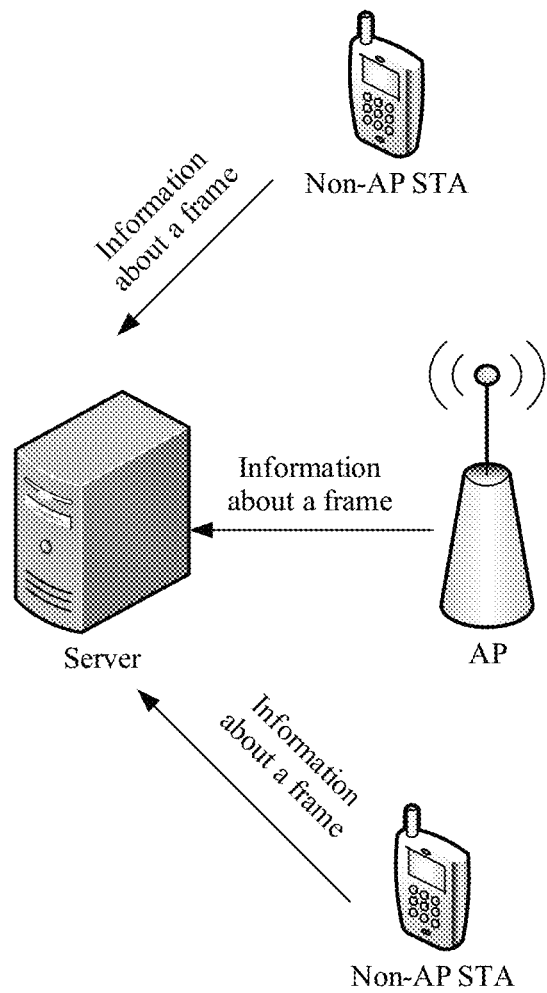
FIG. 5 is a schematic diagram of still another application scenario according to an embodiment of this application.

In still another example, the server may collect information about frames of a plurality of APs and information about frames of a plurality of non-AP stations. FIG. 5 is a schematic diagram of still another application scenario according to an embodiment of this application. The application scenario shown in FIG. 5 includes one server (or may include a plurality of servers), a plurality of APs (only one AP is shown in FIG. 5) managed by the server, and a plurality of non-AP stations. Specifically, that the server collects information about frames of a plurality of APs and information about frames of a plurality of non-AP stations includes: The server obtains information about frames of the APs from the APs, and the server obtains information about frames of the non-AP stations from the non-AP stations.

The server may actively obtain the information about the frame of the AP, or the AP may actively send the information about the frame of the AP to the server. Similarly, the server may actively obtain the information about the frame of the non-AP station, and the non-AP station may actively send the information about the frame of the non-AP station to the server.

In an embodiment, the AP may alternatively collect information about frames of one or more non-AP stations managed by the AP, and then send the information to the server in a unified manner. The server may alternatively send a request to the AP, to request the AP to report information about frames of one or more non-AP stations managed by the AP.

In an embodiment, time synchronization may be performed between APs, to reduce a clock offset between different APs.

In an embodiment, time synchronization may be performed between non-AP stations, to reduce a clock offset between different non-AP stations.

In an embodiment, time synchronization may be performed between the AP and the non-AP station, to reduce a clock offset between the AP and the non-AP station.

In an embodiment, the AP may alternatively collect clock signals of different non-AP stations, and then determine an offset between the clock signal of the non-AP station and the standard clock signal. Finally, the AP calibrates the information about the frame from the non-AP station based on the difference. For example, if the AP determines that a difference between a non-AP station 1 and the standard clock signal is +500 milliseconds, and the AP determines that a difference between a non-AP station 2 and the standard clock signal is −500 milliseconds, the AP determines that a clock offset between the non-AP station 1 and the non-AP station 2 is 1000 milliseconds. The AP calibrates information about a frame from the non-AP station 1 and information about a frame from the non-AP station 2 based on the clock offset, to ensure accuracy of the information about the frame.

In an embodiment, the server may alternatively collect clock signals of different APs and/or non-AP stations, and then determine a difference between the clock signal of the AP and/or non-AP station and the standard clock signal. Finally, the server calibrates information about a frame from the AP and/or non-AP station based on the difference, to ensure accuracy of the information about the frame.

In embodiments of this application, for ease of descriptions, a set of frames sent by APs is referred to as a first frame set, and frames sent by non-AP stations are collectively referred to as a second frame set.

The server in embodiments of this application may be a controller, a switch, a router, or another network device having a management function. The server may be integrated with a station. To be specific, the server is a hardware module in the station, or the server is a software module in the station. Alternatively, the server may be a cloud server running in a cloud. This is not limited in embodiments of this application.

Figure 6:
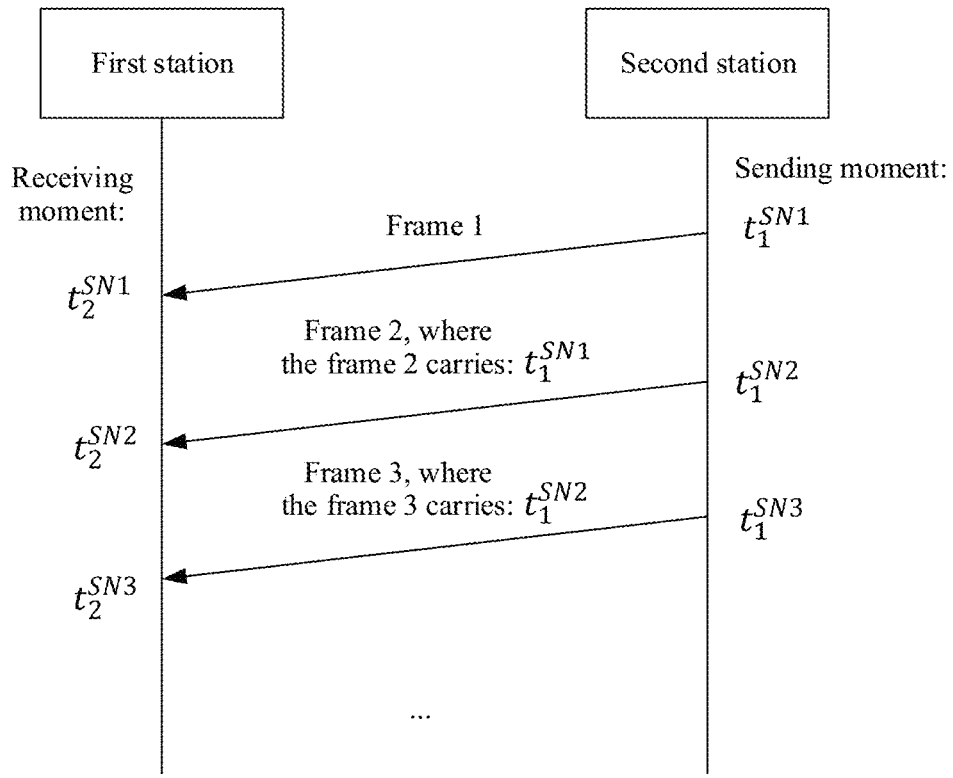
FIG. 6 is a schematic diagram of a time calibration method according to an embodiment of this application.

A time calibration solution in embodiments of this application includes but is not limited to a Network Time Protocol (NTP)-based time calibration solution, a Precision Time Protocol (PTP)-based time calibration solution, or another time calibration solution. The following provides an example for descriptions. FIG. 6 is a schematic diagram of a time calibration method according to an embodiment of this application. The plurality of stations in embodiments of this application include a first station and a second station. The second station sends a plurality of frames such as a frame 1, a frame 2, and a frame 3 to the first station (when the frame 1 is used as the first frame, the frame 2 is used as the second frame; when the frame 2 is used as the first frame, the frame 3 is used as the second frame; and so on). A sending moment of the frame 1 in the second station is $t_1^{SN1}$, and a receiving moment of the frame 1 in the first station is $t_2^{SN1}$. A sending moment of the frame 2 in the second station is $t_1^{SN2}$, a receiving moment of the frame 2 in the first station is $t_2^{SN2}$, and the frame 2 carries the sending moment $t_1^{SN1}$ of the frame 1. The first station calculates a clock offset between clocks of the first station and the second station based on $t_2^{SN1}$ and $t_1^{SN1}$. A sending moment of the frame 3 in the second station is $t_1^{SN3}$, a receiving moment of the frame 3 in the first station is $t_2^{SN3}$ and the frame 3 carries the sending moment $t_1^{SN2}$ of the frame 2. The first station calculates the clock offset between the clocks of the first station and the second station based on $t_2^{SN2}$ and $t_1^{SN2}$ (the clock offset between the clocks of the first station and the second station is equal to a receiving moment of the first frame minus a sending moment of the first frame, for example, the clock offset between the clocks of the first station and the second station is equal to $t_2^{SN1} - t_1^{SN1}$). By analogy, the first station continuously calculates and updates the clock offset between the clocks of the first station and the second station based on a plurality of frames from the second station, to ensure precision of the clock of the first station.

Then, some concepts in embodiments of this application are described.

1. Carrier Sense Multiple Access with Collision Avoidance (CSMA/CA)

Currently, a CSMA/CA mechanism is usually used in a WLAN. CSMA/CA is an algorithm used to avoid a data transmission collision between stations, cannot detect a collision on a channel when sending a packet, and can only avoid the collision as much as possible. For example, if a computer A and a computer C send control messages to a computer B at the same time, the control messages reach the computer B at the same time. This causes a collision. When such a collision occurs, a sender can randomly wait for a period of time and then resend the control message. Because the control message is much shorter than a data frame, a possibility of a second collision in the WLAN is much lower than that in a conventional Ethernet. Eventually, a control message arrives correctly, and then the computer B sends a response message. Usually, CSMA/CA avoids the collision by using an acknowledgement (ACK) signal. To be specific, a client determines that sent data has reached a destination after receiving an ACK signal returned by a network.

Figure 7:
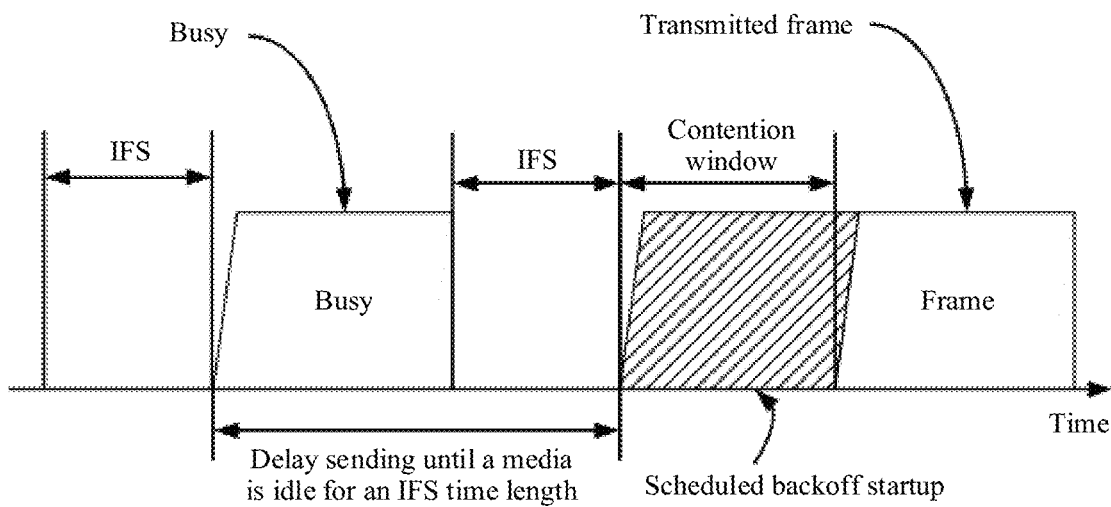
FIG. 7 is a schematic diagram of a CSMA/CA mechanism.

For ease of understanding, refer to FIG. 7. FIG. 7 is a schematic diagram of the CSMA/CA mechanism. According to the 802.11 standard, all stations can send frames after continuously detecting that a channel is idle for a specified time period. The time period is referred to as an interframe space (IFS). Specifically, when the station detects that a transmission medium is busy, which is also referred to as that a medium is busy (or a media is busy), the station does not send a packet (that is, sends a frame). When the station detects that duration in which the transmission medium is idle (or the medium is idle or the media is idle) lasts for one IFS, the station starts a backoff timer. A timing period length of the timer is referred to as a contention window, and a time length of the contention window is a random number whose value is limited. When the timer expires, the station starts to send a packet (that is, a frame).

2. Waiting Interference and Concurrent Interference

A campus wireless local area network (WLAN) is used as an example. The applicant analyzes interference between stations, and determines that interference between the stations may be roughly classified into two types: waiting interference and concurrent interference, which are separately described in the following.

Figure 12:
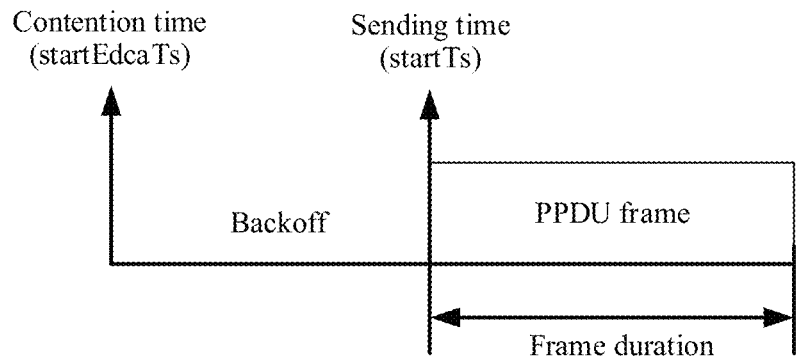
FIG. 12 is a schematic diagram of a frame structure according to an embodiment of this application.

Waiting interference: At least one frame in a plurality of frames is used as an example for descriptions. The waiting interference is that an interference frame occupies contention time of at least one frame, and the interference frame is a frame that causes interference to the at least one frame. A station sending the interference frame is referred to as an interference source. That is, a frame that is in transmitted frames of the interference source and that causes interference to the at least one frame is referred to as an interference frame. The contention time indicates time at which a corresponding frame starts to wait to be sent, or duration in which the corresponding frame waits to be sent. For example, FIG. 12 is a schematic diagram of a frame structure according to an embodiment of this application. The duration in which the frame waits to be sent refers to a difference between time at which the frame starts to be sent and time at which the frame starts to wait to be sent. The time at which the frame starts to be sent is indicated by a sending timestamp (startTs) of the frame, and the time at which the frame starts to wait to be sent is indicated by a contention timestamp (startEdcaTs) of the frame. The duration in which the frame waits to be sent may be backoff (backoff) time.

Figure 8:
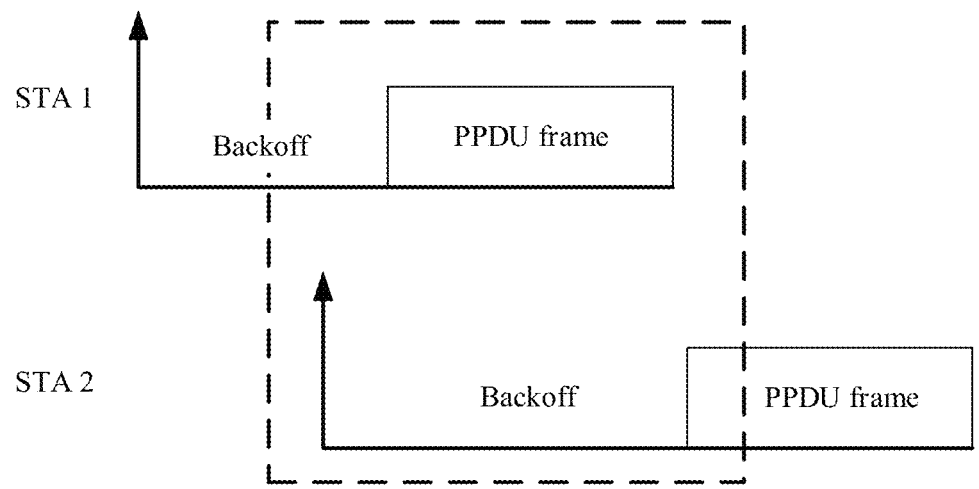
FIG. 8 is a schematic diagram of waiting interference according to an embodiment of this application.

For ease of understanding, in embodiments of this application, an example in which a frame received or sent between stations is a presentation protocol data unit (PPDU) frame is used. FIG. 8 is a schematic diagram of waiting interference according to an embodiment of this application. It can be learned from FIG. 8 that backoff time of a PPDU frame sent by a STA 1 overlaps backoff time of a PPDU frame sent by a STA 2. Therefore, it is considered that the frame sent by the STA 2 in FIG. 8 is subject to waiting interference from the PPDU frame sent by the STA 1.

Concurrent interference: At least one frame is used as an example for descriptions. The concurrent interference is that frame duration of an interference frame and frame duration of the at least one frame coincide or overlap. The interference frame is a frame that causes interference to the at least one frame. A station sending the interference frame is referred to as an interference source. That is, a frame that is in transmitted frames of the interference source and that causes interference to the at least one frame is referred to as an interference frame. For example, the frame duration is a time period in which the frame is actually transmitted, and the frame duration is indicated by a sending timestamp and an end timestamp of the frame.

Figure 9:
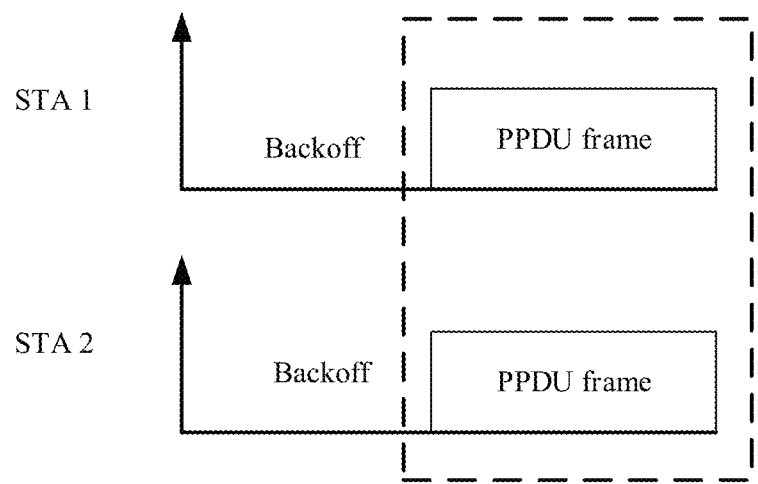
FIG. 9 is a schematic diagram of concurrent interference according to an embodiment of this application.

For ease of understanding, refer to FIG. 9. FIG. 9 is a schematic diagram of concurrent interference according to an embodiment of this application. It can be learned from FIG. 9 that frame duration of a PPDU frame sent by a STA 1 overlaps frame duration of a PPDU frame sent by a STA 2. Therefore, it is considered that the frame sent by the STA 2 in FIG. 9 is subject to concurrent interference from the PPDU frame sent by the STA 1.

Figure 10:
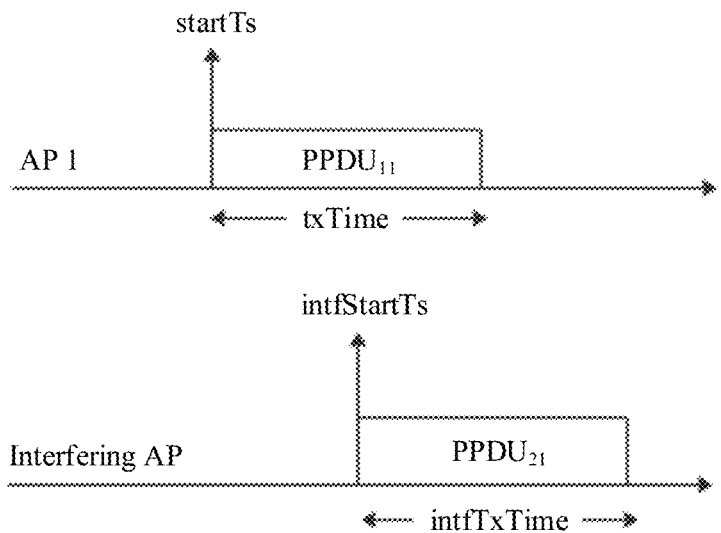
FIG. 10 is a schematic diagram of another type of waiting interference according to an embodiment of this application.

In yet another example, an example in which the station is an AP is used for descriptions. FIG. 10 is a schematic diagram of another type of waiting interference according to an embodiment of this application. It can be known from FIG. 10 that, a sending timestamp (startTs) of a $PPDU_{11}$ frame sent by an AP 1 is smaller than a sending timestamp (intfStartTs) of a $PPDU_{21}$ frame sent by an interfering AP, end time of the $PPDU_{11}$ frame sent by the AP 1 is greater than the sending timestamp of the $PPDU_{21}$ frame sent by the interfering AP, and frame duration (txTime) of the $PPDU_{11}$ partially overlaps frame duration (intfTxTime) of the $PPDU_{21}$. Therefore, the $PPDU_{21}$ frame causes waiting interference to the $PPDU_{11}$ frame.

Figure 11:
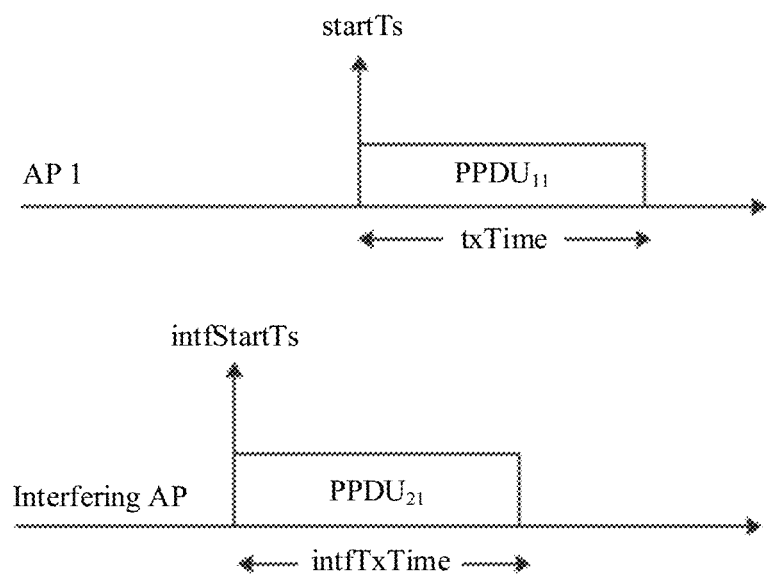
FIG. 11 is a schematic diagram of still another type of waiting interference according to an embodiment of this application.

In still yet another example, an example in which the station is an AP is used for descriptions. FIG. 11 is a schematic diagram of still another type of waiting interference according to an embodiment of this application. It can be learned from FIG. 11 that, a sending timestamp (startTs) of a $PPDU_{11}$ frame sent by an AP 1 is greater than a sending timestamp (intfStartTs) of a $PPDU_{21}$ frame sent by an interfering AP, the sending timestamp (startTs) of the $PPDU_{11}$ frame sent by the AP 1 is less than end time of the $PPDU_{11}$ frame sent by the interfering AP, and frame duration (txTime) of the $PPDU_{11}$ partially overlaps frame duration (intfTxTime) of the $PPDU_{21}$. Therefore, the $PPDU_{21}$ frame causes waiting interference to the $PPDU_{11}$ frame.

Figure 13:
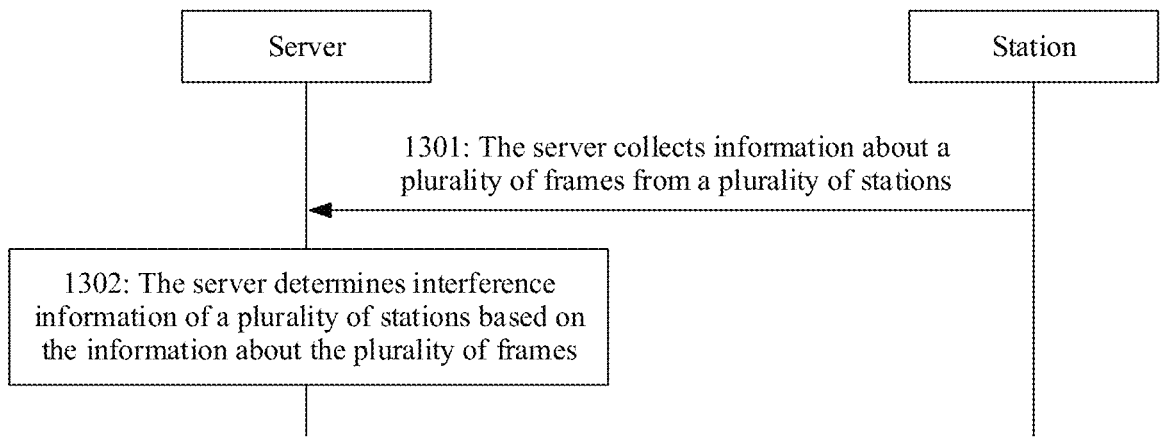
FIG. 13 is a schematic diagram of an embodiment of an interference information detection method according to an embodiment of this application.

Specifically, FIG. 13 is a schematic diagram of an embodiment of an interference information detection method according to an embodiment of this application. The interference information detection method provided in this embodiment of this application includes the following operations.

Operation 1301: A server collects information about a plurality of frames from a plurality of stations.

In this embodiment, the server collects the information about the plurality of frames from the plurality of stations. In this embodiment of this application, the plurality of frames are classified based on sources of the plurality of frames. A set of frames sent by a plurality of APs is referred to as a first frame set, and the first frame set includes one or more of the plurality of frames. A set of frames sent by a plurality of non-AP stations are referred to as a second frame set, and the second frame set includes one or more of the plurality of frames. The frames included in the first frame set and the second frame set are not repeated.

Specifically, the following solutions are included.

(1) The plurality of stations include the plurality of APs. The server collects information about the frames of the plurality of APs from the plurality of APs. In other words, the server collects information about the frames in the first frame set from the plurality of APs. In an embodiment, the plurality of APs may actively report information about the respective frames. For example, the plurality of APs periodically report information about the respective frames. In an embodiment, the server may actively collect the information about the frames of the plurality of APs. For example, the server sends a request to the plurality of APs, and the plurality of APs report the information about the plurality of frames according to the request.

(2) The plurality of stations include an AP and a non-AP station.

Specifically, the plurality of stations include: one AP and one non-AP station, or a plurality of APs and one non-AP station, or one AP and a plurality of non-AP stations, or a plurality of non-AP stations.

In an embodiment, the server collects information about the frames of the plurality of APs from the plurality of APs, and the server collects information about the frames of the plurality of non-AP stations from the plurality of non-AP stations. That is, the server collects the information about respective frames from the AP station and the non-AP station. In other words, the server collects information about the frames in the first frame set from the plurality of APs, and the server collects information about the frames in the second frame set from the plurality of non-AP stations.

In an embodiment, the server collects information about the frames of the plurality of APs and information about the frames of the plurality of non-AP stations from the plurality of APs. The information about the frames of the plurality of non-AP stations is collected by the AP stations from the non-AP stations and then transmitted to the server. That is, the AP station serves as a relay of the non-AP station, and transmits the information about the frame from the non-AP station to the server. In other words, the server collects the information about the frames in the first frame set and the information about the frames in the second frame set from the plurality of APs. The plurality of APs collect the information about the frames in the second frame set from the plurality of non-AP stations and forward the information to the server.

Further, the information about the plurality of frames is classified based on types, and may be classified into a first frame information set and a second frame information set. Specifically, the first frame information set includes sending time, contention time, and frame duration. The sending time is time at which the plurality of stations send frames, and the contention time is time at which a corresponding frame starts to wait to be sent or duration in which the corresponding frame waits to be sent. That is, frames corresponding to the first frame information set are transmitted frames of the plurality of stations. For example, FIG. 12 is a schematic diagram of a frame structure according to an embodiment of this application. The duration in which the frame waits to be sent refers to a difference between time at which the frame starts to be sent and time at which the frame starts to wait to be sent. The time at which the frame starts to be sent is indicated by a sending timestamp (startTs) of the frame, and the time at which the frame starts to wait to be sent is indicated by a contention timestamp (startEdcaTs) of the frame. The duration in which the frame waits to be sent may be backoff (backoff) time. Specifically, the second frame information set includes receiving time and frame duration. The receiving time is time at which the plurality of stations receive the frames. That is, frames corresponding to the second frame information set are received frames of the plurality of stations.

Further, the server collects information about the plurality of frames within an information-collecting time period from the plurality of stations. For example, if the information-collecting time period is 30 seconds, the server collects the information about the plurality of frames within the information-collecting time period (30 seconds) from the plurality of stations. For another example, if the information-collecting time period is 15:00 to 15:05, the server collects the information about the plurality of frames within the information-collecting time period (15:00 to 15:05) from the plurality of stations. For still another example, if the information-collecting time period is every 5 minutes, the server periodically collects the information about the plurality of frames within the information-collecting time period (every 5 minutes) from the plurality of stations.

It may be understood that the server may collect the information about the plurality of frames within the information-collecting time period from the plurality of stations in real time, or the server may collect, from the plurality of stations after a period of time, the information about the plurality of frames within the information-collecting time period. For example, each station stores the information about the plurality of frames within the information-collecting time period (every 5 minutes), and the server collects, from the plurality of stations every 30 minutes, information about the plurality of frames stored by the plurality of stations (including information about the plurality of frames within six information-collecting time periods).

In an embodiment, the AP may perform time calibration on the information about the frame of the AP, and then send information obtained after time calibration to the server, for example, perform time calibration for time (the time includes but is not limited to the receiving time, the sending time, the contention time, or the frame duration) in the information about the frame, In an embodiment, the server may alternatively determine interference information of the plurality of APs after performing time calibration on the collected information about the frames of the APs.

In an embodiment, the server may alternatively determine interference information of the plurality of APs and the non-AP stations after performing time calibration on the collected information about the frames of the APs and the non-AP stations.

In an embodiment, after receiving the information about the frames of the plurality of non-AP stations, the AP performs time calibration on the information about the frames of the plurality of non-AP stations, and then sends information obtained after time calibration to the server. In this case, the AP needs to perform processing (time calibration) on the information about the frame from the non-AP station, and then send information obtained after time calibration to the server. Specifically, the AP performs time calibration on information about a frame of a non-AP station associated with (for example, communicatively connected to) the AP, and then sends information obtained after time calibration to the server.

In an embodiment, the non-AP station performs time calibration on the information about the frame of the non-AP station, and then sends information obtained after time calibration to the AP. Then, the AP forwards the information obtained after time calibration to the server. In this case, the AP does not need to perform processing (time calibration) on the information about the frame from the non-AP station, but directly forwards the information about the frame from the non-AP station to the server.

Information about at least one of the plurality of frames further includes one or more of the following: a frame type of the at least one frame, a frame subtype of the at least one frame, an uplink identifier or a downlink identifier of the at least one frame, a source address of the at least one frame, a destination address of the at least one frame, or an identifier indicating whether the at least one frame is successfully transmitted.

For example, the frame type of the at least one frame includes but is not limited to a control frame (Ctrl) type, a management frame (Mgmt) type, or a data frame (Data) type.

For example, the frame subtype of the at least one frame includes but is not limited to a request to send (RTS) frame subtype, a clear to send (BA) frame subtype, an acknowledgment (ACK) frame subtype, or a QoS data (QoS data) frame subtype.

For example, when the frame is a transmitted frame, the information about the frame includes the destination address of the frame. When the frame is a received frame, the information about the frame includes the source address of the frame.

For example, when the frame is an uplink frame (that is, a frame sent by the non-AP station to the AP), the frame includes the uplink identifier. For example, a field of the frame is "1", and the field "1" indicates that the frame is an uplink frame. When the frame is a downlink frame (that is, a frame sent by the AP to the non-AP station), the frame includes the downlink identifier. For example, a field of the frame is "0", and the field "0" indicates that the frame is a downlink frame.

Operation 1302: The server determines interference information of a plurality of stations based on the information about the plurality of frames.

In this embodiment, after collecting the information about the plurality of frames, the server determines the interference information of the plurality of stations based on the information about the plurality of frames. Specifically, after collecting the information about the plurality of frames, the server processes the information about the plurality of frames in a time sequence, to determine the interference information of the plurality of stations. The server may process the information about the plurality of frames in one or more time periods. The time period may be preconfigured, or may be determined based on a user instruction. This is not limited in embodiments of this application.

After the server collects information about a frame, the server determines waiting time, sending time, frame duration, and sending end time of the frame. For example, the server determines a moment at which the frame enters the waiting time, duration of the waiting time, a moment at which the frame starts to be sent, duration of sending, and a moment at which sending of the frame ends. Then, the server searches, based on the information, whether another frame causes interference to the frame. For example, the server determines whether another frame causes interference to the frame in the sending time period of the frame. The sending time period is a time period from a moment of entering the waiting time to a moment of ending sending. Causing interference means that a sending time period of the another frame overlaps the sending time period of the frame.

After determining a frame that causes interference to the frame, the server determines interference information about the frame. The interference information includes but is not limited to: The server determines frames causing interference as interference frames of the frame. A station that sends an interference frame serves as an interference source of the frame. Overlapping time between a sending time period of the interference frame and the sending time period of the frame is interference time. Further, the server may alternatively determine an interference frame of a station that sends the frame (that is, the interference frame of the frame determined in the foregoing procedure). The server may alternatively determine an interference source of a station that sends the frame (that is, the interference source of the frame determined in the foregoing procedure). The server may alternatively determine interference time of a station that sends the frame (that is, the interference time of the frame determined in the foregoing procedure).

The interference information includes one or more of the following items:

interference sources of at least one of the plurality of frames. Further, the interference source includes a waiting interference source and/or a concurrent interference source. The waiting interference source is a station that causes waiting interference to the at least one frame or any station, and the concurrent interference source is a station that causes concurrent interference to the at least one frame or any station; The waiting interference is that a transmitted frame of the interference source occupies waiting time of the at least one frame, or the waiting interference is that a transmitted frame of the interference source occupies waiting time of any transmitted frame of the any station. The concurrent interference is that frame duration of the at least one frame and frame duration of the transmitted frame of the interference source coincide or overlap, or the concurrent interference is that frame duration of the transmitted frame of the interference source and frame duration of any transmitted frame of the any station coincide or overlap. For example, an AP 1 is used as an example. Interference sources of a frame 1, a frame 2, and a frame 3 in the AP 1 are shown in Table 1-1.

TABLE 1-1

| Interfered frame | Interference source type | Interference source name | Interference type |
|---|---|---|---|
| Frame 1 | Concurrent interference source | AP 2 | Concurrent interference |
|  | — | AP 3 | Waiting interference |
|  | — | AP 4 | Concurrent interference |
| Frame 2 | — | AP 3 | Concurrent interference |
|  | Waiting interference source | AP 5 | Waiting interference |
| Frame 3 | Concurrent interference source | AP 5 | Concurrent interference |

Specifically, in Table 1-1, a plurality of APs (the AP 2, the AP 3, and the AP 4) cause interference to the frame 1, and the server selects the AP 2 with largest interference energy as an interference source that causes interference to the frame 1. An interference source type of the interference source is concurrent interference source. Similarly, the AP 3 and the AP 5 cause interference to the frame 2, and interference energy of the AP 5 is the largest. Therefore, the AP 5 is used as an interference source of the frame 2, and an interference source type of the interference source is waiting interference source.

In another example, an AP 1 is used as an example. Interference sources of a frame 1, a frame 2, and a frame 3 in the AP 1 are shown in Table 1-2.

TABLE 1-2

| Interfered frame | Interference source type | Interference source name | Interference type |
|---|---|---|---|
| Frame 1 | Concurrent interference source | AP 2 | Concurrent interference |
| | Waiting interference source | AP 3 | Waiting interference |
| | — | AP 4 | Concurrent interference |
| | — | AP 5 | Waiting interference |
| Frame 2 | — | AP 3 | Concurrent interference |
| | Waiting interference source | AP 5 | Waiting interference |
| Frame 3 | Concurrent interference source | AP 5 | Concurrent interference |

Specifically, in Table 1-2, a plurality of APs (AP2, AP3, and AP4) cause interference to the frame 1. For different interference types, the server selects a station with largest interference energy from stations of various interference types as an interference source of the interference type. The frame 1 is used as an example. The AP 2 and the AP 4 cause concurrent interference to the frame 1, and the AP 3 and the AP 5 cause waiting interference to the frame 1. Because interference energy of the AP 2 is greater than that of the AP 4, and interference energy of the AP 3 is greater than that of the AP 5, the server selects the AP 2 as a concurrent interference source of the frame 1, and selects the AP 3 as a waiting interference source of the frame 1.

The interference information may further include interference time of at least one frame in the plurality of frames, where the interference time of the at least one frame is time at which the at least one frame is interfered. Further, the interference time includes concurrent interference time and/or waiting interference time. The waiting interference time is time at which the at least one frame is subject to waiting interference or time at which the any station is subject to waiting interference, and the concurrent interference time is time at which the at least one frame is subject to concurrent interference or time at which the any station is subject to concurrent interference. For example, an AP 1 is used as an example. Interference time of a frame 1, a frame 2, and a frame 3 in the AP 1 is shown in Table 2 or Table 3.

TABLE 2

| Interfered frame | Interference source name | Interference type | Interference time |
|---|---|---|---|
| Frame 1 | AP 2 | Concurrent interference | 30 microseconds |
| | AP 3 | Waiting interference | 20 microseconds |
| | AP 4 | Concurrent interference | 50 microseconds |
| Frame 2 | AP 3 | Concurrent interference | 10 microseconds |
| | AP 5 | Waiting interference | 20 microseconds |
| Frame 3 | AP 5 | Concurrent interference | 30 microseconds |

TABLE 3

| Interfered frame | Interference frame name | Interference type | Interference time |
|---|---|---|---|
| Frame 1 | Frame 3 of an AP 2 | Concurrent interference | 30 microseconds |
| | Frame 10 of an AP 3 | Waiting interference | 20 microseconds |
| | Frame 5 of an AP 4 | Concurrent interference | 50 microseconds |
| Frame 2 | Frame 15 of the AP 3 | Concurrent interference | 10 microseconds |
| | Frame 7 of an AP 5 | Waiting interference | 20 microseconds |
| Frame 3 | Frame 13 of the AP 5 | Concurrent interference | 30 microseconds |

In the example of Table 3, the frame 3 of the AP 2 and the frame 5 of the AP 4 may be considered as concurrent interference frames of the frame 1 of the AP 1, and the frame 10 of the AP 3 may be considered as a waiting interference frame of the frame 1 of the AP 1.

The interference information may further include an interference source proportion of at least one frame in the plurality of frames, where the interference source proportion of the at least one frame is a ratio of time of interference caused by any interference source to the at least one frame to a sum of time of interference caused by all the interference sources to the at least one frame. For example, an AP 1 is used as an example. Interference source proportions of a frame 1, a frame 2, and a frame 3 in the AP 1 are shown in Table 4.

TABLE 4

| Interfered frame | Interference source name | Interference type | Interference source proportion |
|---|---|---|---|
| Frame 1 | AP 2 | Concurrent interference | 37.5% |
| | AP 3 | Waiting interference | 100% |
| | AP 4 | Concurrent interference | 62.5% |
| Frame 2 | AP 3 | Concurrent interference | 25% |
| | AP 5 | Waiting interference | 30% |
| | AP 6 | Concurrent interference | 75% |
| | AP 7 | Waiting interference | 60% |
| Frame 3 | AP 5 | Concurrent interference | 100% |

The interference information may further include an interference source sequence of at least one frame in the plurality of frames, where the interference source sequence of the at least one frame is a result of sorting all interference sources based on interference time of the at least one frame. For example, an AP 1 is used as an example. An interference source sequence of a frame 1, a frame 2, and a frame 3 in the AP 1 are shown in Table 5.

TABLE 5

| Interfered frame | Interference source name | Interference type | Interference source sequence |
|---|---|---|---|
| Frame 1 | AP 2 | Concurrent interference | 3 |
| | AP 3 | Waiting interference | 2 |
| | AP 4 | Concurrent interference | 1 |
| Frame 2 | AP 3 | Concurrent interference | 3 |
| | AP 5 | Waiting interference | 4 |

TABLE 5-continued

| Interfered frame | Interference source name | Interference type | Interference source sequence |
|---|---|---|---|
| | AP 6 | Concurrent interference | 1 |
| | AP 7 | Waiting interference | 2 |
| Frame 3 | AP 5 | Concurrent interference | 1 |

The interference information may further include interference sources of any station in the plurality of stations. For example, an AP 1, an AP 2, and an AP 3 are used as an example. Interference sources of the AP 1, the AP 2, and the AP 3 are shown in Table 6.

TABLE 6

| Interfered stations | Interference source name | Interference source type |
|---|---|---|
| AP 1 | AP 2 | Concurrent interference source |
| | AP 3 | Waiting interference source |
| | AP 4 | Concurrent interference source |
| AP 2 | AP 3 | Concurrent interference source |
| | AP 1 | Concurrent interference source |
| | AP 5 | Waiting interference source |
| AP 3 | AP 5 | Concurrent interference source |
| | AP 2 | Concurrent interference source |

It may be understood that, a station may be subject to concurrent interference and waiting interference from another station. For example, the AP 1 may be subject to concurrent interference and waiting interference from the AP 2. In this case, the interference sources of the AP 1 include the AP 2, and an interference source type of the AP 2 is waiting interference source and concurrent interference source.

The interference information may further include interference time of any station in the plurality of stations, where the interference time of the any station is time at which the any station is interfered. For example, an AP 1, an AP 2, and an AP 3 are used as an example. Interference time of the AP 1, the AP 2, and the AP 3 is shown in Table 7 or Table 8.

TABLE 7

| Interfered stations | Interference source name | Interference type | Interference time |
|---|---|---|---|
| AP 1 | AP 2 | Concurrent interference | 1000 microseconds |
| | | Waiting interference | 350 microseconds |
| | AP 3 | Waiting interference | 2000 microseconds |
| | AP 4 | Concurrent interference | 500 microseconds |
| AP 2 | AP 3 | Concurrent interference | 1200 microseconds |
| | AP 5 | Waiting interference | 700 microseconds |
| AP 3 | AP 5 | Concurrent interference | 800 microseconds |

TABLE 8

| Interfered stations | Interference frame name | Interference type | Interference time |
|---|---|---|---|
| AP 1 | Frame 3 of an AP 2 | Concurrent interference | 30 microseconds |
| | Frame 10 of an AP 3 | Waiting interference | 20 microseconds |
| | Frame 5 of an AP 4 | Concurrent interference | 50 microseconds |
| AP 2 | Frame 15 of the AP 3 | Concurrent interference | 10 microseconds |
| | Frame 7 of an AP 5 | Waiting interference | 20 microseconds |
| AP 3 | Frame 13 of the AP 5 | Concurrent interference | 30 microseconds |

In the example of Table 8, the frame 3 of the AP 2 and the frame 5 of the AP 4 may be considered as concurrent interference frames of the AP 1, and the frame 10 of the AP 3 may be considered as a waiting interference frame of the AP 1.

The interference information may further include an interference source proportion of any station in the plurality of stations, where the interference source proportion of the any station is a ratio of time of interference caused by any interference source to the any station to a sum of time of interference caused by all the interference sources to the any station. For example, an AP 1, an AP 2, and an AP 3 are used as an example. Interference source proportions of the AP 1, the AP 2, and the AP 3 are shown in Table 9.

TABLE 9

| Interfered stations | Interference source name | Interference type | Interference source proportion |
|---|---|---|---|
| AP 1 | AP 2 | Concurrent interference | 37.5% |
| | AP 3 | Waiting interference | 100% |
| | AP 4 | Concurrent interference | 62.5% |
| AP 2 | AP 3 | Concurrent interference | 25% |
| | AP 5 | Waiting interference | 30% |
| | AP 6 | Concurrent interference | 75% |
| | AP 7 | Waiting interference | 60% |
| AP 3 | AP 5 | Concurrent interference | 100% |

The interference information may further include an interference source sequence of any station in the plurality of stations, where the interference source sequence of the any station is a result of sorting all interference sources based on time of interference caused by all the interference sources on the any station. For example, an AP 1, an AP 2, and an AP 3 are used as an example. An interference source sequence of the AP 1, the AP 2, and the AP 3 is shown in Table 10.

TABLE 10

| Interfered stations | Interference source name | Interference type | Interference source sequence |
|---|---|---|---|
| AP 1 | AP 2 | Concurrent interference | 3 |
| | AP 3 | Waiting interference | 2 |
| | AP 4 | Concurrent interference | 1 |
| AP 2 | AP 3 | Concurrent interference | 3 |
| | AP 5 | Waiting interference | 4 |
| | AP 6 | Concurrent interference | 1 |
| | AP 7 | Waiting interference | 2 |
| AP 3 | AP 5 | Concurrent interference | 1 |

The interference information may further include an interference time proportion of any station in the plurality of stations, where the interference time proportion of the any station is a ratio of a sum of interference time of the at least one frame of the any station to the information-collecting time period, and the information-collecting time period is a time period in which the server collects the information about the plurality of frames from the plurality of stations. For example, an AP 1, an AP 2, and an AP 3 are used as an example. Interference time proportions of the AP 1, the AP 2, and the AP 3 are shown in Table 11.

TABLE 11

| Interfered stations | Interference source name | Interference type | Interference time proportion |
|---|---|---|---|
| AP 1 | AP 2 | Concurrent interference | 10% |
|  |  | Waiting interference | 3.5% |
|  | AP 3 | Waiting interference | 20% |
|  | AP 4 | Concurrent interference | 5% |
| AP 2 | AP 3 | Concurrent interference | 12% |
|  | AP 5 | Waiting interference | 7% |
| AP 3 | AP 5 | Concurrent interference | 8% |

It may be understood that the interference time proportion of any station may alternatively be a ratio of a sum of interference time of at least one frame of any station to a preset time period. The preset time period is a time period predefined by the user, and the preset time period may be inconsistent with the statistics time period. For example, the preset time period is 10 seconds, and the information-collecting time period is 5 seconds.

The following describes how to calculate interference information by using an example in which the plurality of frames include a first frame and a second frame.

First, a method for calculating waiting interference time is described. In an example, the plurality of frames include the first frame and the second frame, the plurality of stations include a first station and a second station, the first station sends the first frame, and the second station sends the second frame.

When sending time of the second frame is greater than waiting time of the first frame, and a sum of the sending time of the second frame and frame duration of the second frame is less than sending time of the first frame, the interference time includes waiting interference time of the first frame. The waiting interference time of the first frame is equal to contention time of the second frame.

Second, a method for calculating concurrent interference time is described. In an example, the plurality of frames include the first frame and the second frame, the plurality of stations include a first station and a second station, the first station sends the first frame, and the second station sends the second frame.

When sending time of the second frame is greater than or equal to frame duration of the first frame, and contention time of the second frame is less than a sum of sending time of the first frame and the frame duration of the first frame, the interference time includes concurrent interference time of the first frame. The concurrent interference time of the first frame is equal to the contention time of the second frame.

Second, a method for calculating an interference time proportion is described. In an example, the interference time proportion of the any station in the plurality of stations includes waiting interference time proportion of the any station. The waiting interference time proportion is a ratio of waiting interference time of a transmitted frame of the any station to the information-collecting time period, the waiting interference time is a sum of backoff time of transmitted frames that are in the any station and on which waiting interference occurs, and the backoff time of the transmitted frame is equal to a difference between sending time of the transmitted frame and contention time of the transmitted frame. For example, if waiting interference time of any station is 1000 microseconds, and the information-collecting time period is 10 seconds, the waiting interference time proportion is 1%. In another example, the AP 1 is used as an example. If time of waiting interference caused by the AP 2 to the AP 1 is 100 microseconds, and the information-collecting time period is 10 seconds, a time proportion of waiting interference caused by the AP 2 to the AP 1 is 0.1%. If time of waiting interference caused by the AP 3 to the AP 1 is 500 microseconds, and the information-collecting time period is 10 seconds, a time proportion of waiting interference caused by the AP 3 to the AP 1 is 0.5%.

In still another example, the interference time proportion of the any station in the plurality of stations includes a concurrent interference time proportion of the any station. The concurrent interference time proportion of the any station is a ratio of concurrent interference time of a transmitted frame of the any station to the information-collecting time period, and the concurrent interference time is frame duration of the transmitted frame that is in the any station and on which concurrent interference occurs. For example, if concurrent interference time of any station is 500 microseconds, and the information-collecting time period is 10 seconds, the concurrent interference time proportion is 0.5%. In another example, the AP 1 is used as an example. If concurrent interference time of the AP 2 to the AP 1 is 100 microseconds, and the information-collecting time period is 10 seconds, a concurrent interference time proportion of the AP 2 to the AP 1 is 0.1%. If concurrent interference time of the AP 3 to the AP 1 is 500 microseconds, and the information-collecting time period is 10 seconds, a concurrent interference time proportion of the AP 3 to the AP 1 is 0.5%.

It may be understood that the interference time proportion of any station may alternatively be a ratio of a sum of interference time of at least one frame of any station to a preset time period. The preset time period may be a time period predefined by the user, and the preset time period may be inconsistent with the statistics time period. For example, the preset time period is 10 seconds, and the information-collecting time period is 5 seconds.

For another example, the preset time period may be a total time period of sending time of 1000 frames of the station, and the total time period may be determined based on a difference between sending time of the $1^{st}$ frame and sending time of the $1000^{th}$ frame.

Second, a method for calculating an interfering source proportion is described. In an example, the interference source proportion of the at least one frame in the plurality of frames includes a waiting interference source proportion of the at least one frame, where the waiting interference source proportion is a ratio of a first time period to a plurality of first time periods, the first time period is an overlapping time period between frame duration of any waiting interference frame and backoff time of the transmitted frame, the waiting interference frame is a frame that causes waiting interference to the transmitted frame, and the plurality of first time periods are a sum of first time periods of all waiting interference frames that cause waiting interference to the transmitted frame. For example, the frame 1 of the AP 1 is used as an example. Waiting interference frames that cause waiting interference to the frame 1 of the AP1 include a frame 2 of the AP 2 and a frame 1 of the AP 3. If duration (that is, the first time period) of waiting interference caused by the frame 2 of the AP 2 to the frame 1 of the AP 1 is 50 microseconds, and duration (that is, the first time period) of waiting interference caused by the frame 1 of the AP 3 to the frame 1 of the AP 1 is 30 microseconds, an interference source proportion of the frame 1 of the AP 1 includes AP 2 (37.5%) and AP 3 (62.5%).

In another example, the interference source proportion of the at least one frame in the plurality of frames includes a concurrent interference source proportion of the at least one frame. The concurrent interference source proportion is a ratio of a second time period to a plurality of second time periods, the second time period is frame duration of any concurrent interference frame, the concurrent interference frame is a frame that causes concurrent interference to a transmitted frame of the any station, and the plurality of second time periods are a sum of frame duration of all concurrent interference frames that cause concurrent interference to the transmitted frame. For example, the frame 1 of the AP 1 is used as an example. Concurrent interference frames that cause concurrent interference to the frame 1 of the AP1 include a frame 2 of the AP 2 and a frame 1 of the AP 3. If duration (that is, the second time period) of concurrent interference caused by the frame 2 of the AP 2 to the frame 1 of the AP 1 is 50 microseconds, and duration (that is, the second time period) of concurrent interference caused by the frame 1 of the AP 3 to the frame 1 of the AP 1 is 30 microseconds, an interference source proportion of the frame 1 of the AP 1 includes AP 2 (37.5%) and AP 3 (62.5%).

It may be understood that the plurality of stations in the foregoing solutions may be intra-frequency stations, or may be different-frequency stations. In this embodiment of this application, an intra-frequency station is used as an example for descriptions.

Figure 14:
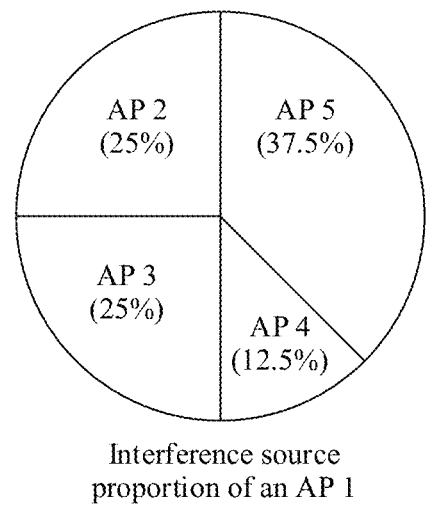
FIG. 14 is a schematic diagram of interference information according to an embodiment of this application.

Further, the interference information of the plurality of stations determined by the server in operation 1302 may be presented to the user in a plurality of manners, including but not limited to a histogram, a bar chart, a line chart, a pie chart, a scatter chart, a radar chart, a table, or a text. For ease of understanding, refer to FIG. 14. FIG. 14 is a schematic diagram of the interference information according to an embodiment of this application. FIG. 14 shows an interference source proportion of the AP 1. Stations that cause interference to the AP 1 include the AP 2, the AP3, the AP 4, and the AP 5. Interference caused by the AP 2 to the AP 1 accounts for 25% of interference caused by all interference sources to the AP 1. Interference caused by the AP 3 to the AP 1 accounts for 25% of interference caused by all the interference sources to the AP 1. Interference caused by the AP 4 to the AP 1 accounts for 12.5% of interference caused by all the interference sources to the AP 1. Interference caused by the AP 5 to the AP 1 accounts for 37.5% of interference caused by all the interference sources to the AP 1.

Further, based on the interference information of the plurality of stations determined by the server in operation 1302, communication quality of the plurality of stations may be improved by using a plurality of methods. For example, the interference information of the plurality of stations is used as an input of a distributed channel access (DCA) algorithm to adjust the network parameter, or the interference information of the plurality of stations is used as an input of a coordinated scheduling algorithm to adjust the network parameter. For another example, when the interference information of the plurality of stations indicates that a station (for example, the AP 1) is subject to severe interference from a specific station (for example, the AP 2), a channel of the AP 1 and/or a channel of the AP 2 are/is adjusted. For still another example, when the interference information of the plurality of stations indicates that a station (for example, the AP 1) is subject to severe interference from a specific station (for example, the AP 2), sending power of the station (the AP 1) is increased. For yet another example, when the interference information of the plurality of stations indicates that a station (for example, the AP 1) is subject to severe interference from a specific station (for example, the AP 2), load of the station (that is, the AP 2) that causes interference to the station (the AP 1) is reduced.

An embodiment of this application provides an interference information detection method. A server collects information about a plurality of frames from a plurality of stations. Information about some of the plurality of frames includes sending time, contention time, and frame duration, and the contention time indicates time at which a corresponding frame starts to wait to be sent or duration in which the corresponding frame waits to be sent. The server determines interference information of the plurality of stations based on the information about the plurality of frames. The server collects the information about the plurality of frames from the plurality of stations, so that the server can analyze the interference information of the plurality of stations based on the information about the plurality of frames with a small granularity. This improves accuracy of the interference information. This feature accurately displays interference information of each station without affecting services, to improve current communication quality.

Figure 15:
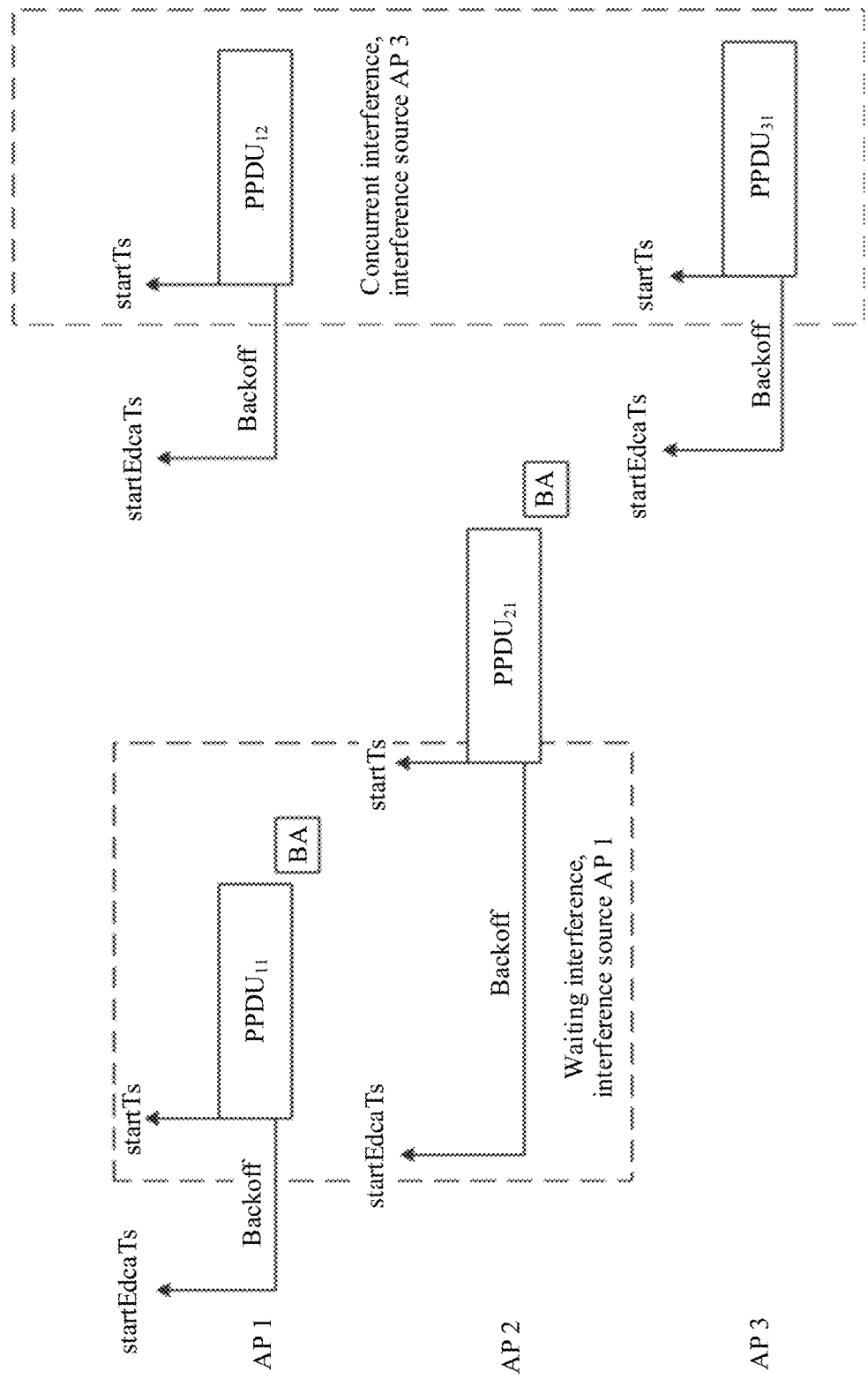
FIG. 15 is a schematic diagram of yet another application scenario according to an embodiment of this application.

The following further describes, with reference to application scenarios, the interference information detection method provided in an embodiment of this application. FIG. 15 is a schematic diagram of an application scenario according to an embodiment of this application. In the application scenario shown in FIG. 15, the plurality of stations include an AP 1, an AP 2, and an AP 3. After collecting the information about the frames of the plurality of stations, the server determines the interference information of the plurality of stations. Specifically, a $PPDU_{21}$ sent by the AP 2 is subject to interference from a $PPDU_{11}$ sent by the AP 1, the $PPDU_{11}$ is a waiting interference frame of the $PPDU_{21}$, and a waiting interference source of the AP 2 is the AP 1. A $PPDU_{12}$ sent by the AP 1 is subject to interference from a $PPDU_{31}$ sent by the AP 3, the $PPDU_{31}$ is a concurrent interfering frame of the $PPDU_{12}$, and a concurrent interference source of the AP 1 is the AP 3.

Figure 16:
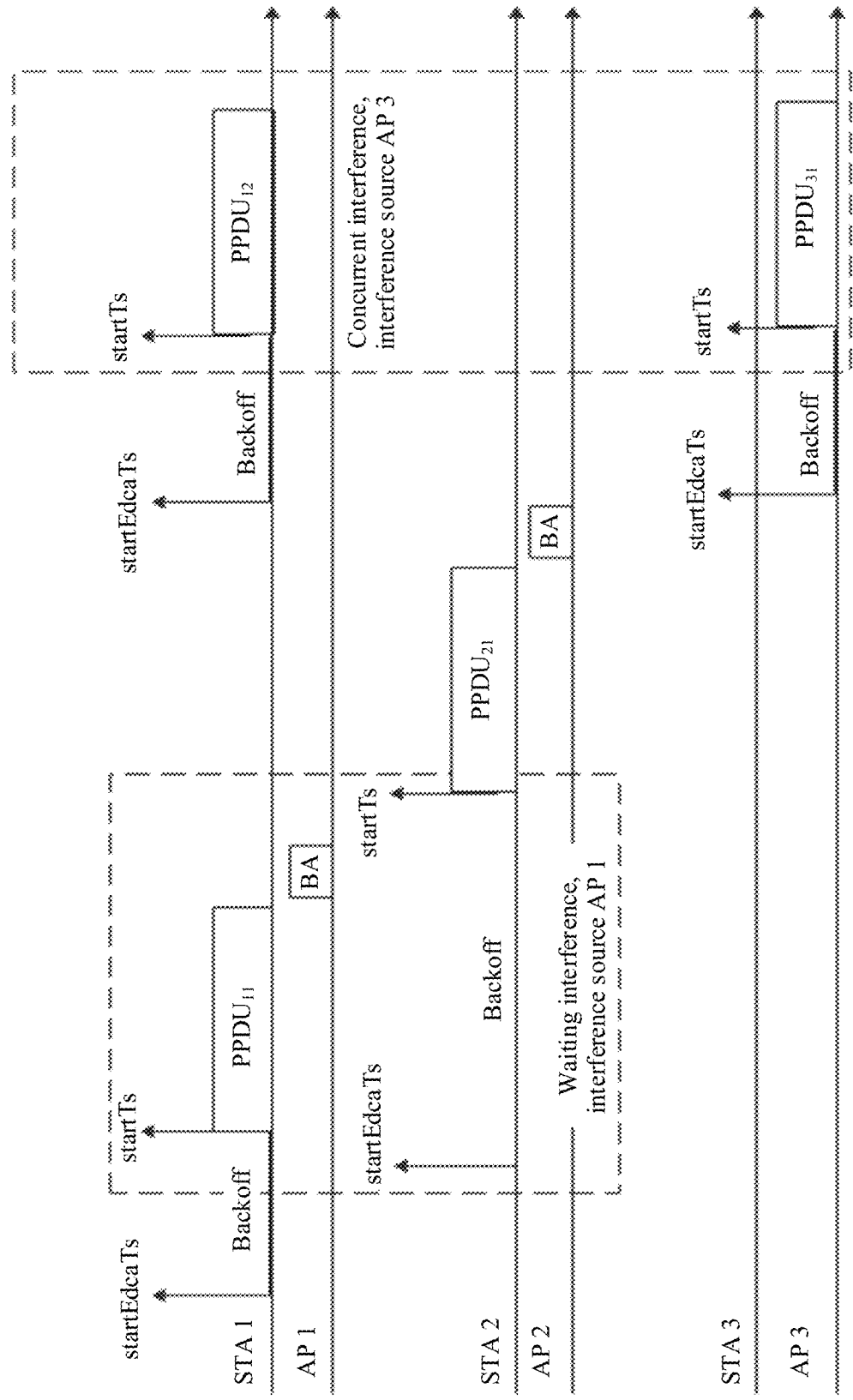
FIG. 16 is a schematic diagram of still yet another application scenario according to an embodiment of this application.

FIG. 16 is a schematic diagram of an application scenario according to an embodiment of this application. In the application scenario shown in FIG. 16, a plurality of stations include an AP 1, an AP 2, an AP 3, a STA 1, a STA 2, and a STA 3. After collecting the information about the frames of the plurality of stations, the server determines the interference information of the plurality of stations. Specifically, a $PPDU_{21}$ sent by the STA 2 is subject to interference from a $PPDU_{11}$ sent by the STA 1, the $PPDU_{11}$ is a waiting interference frame of the $PPDU_{21}$, and a waiting interference source of the STA 2 is the STA 1. A $PPDU_{12}$ sent by the STA 1 is subject to interference from a $PPDU_{31}$ sent by the AP 3, the $PPDU_{31}$ is a concurrent interfering frame of the $PPDU_{12}$, and a concurrent interference source of the STA 1 is the AP 3.

The foregoing mainly describes the solutions provided in embodiments of this application from the perspective of the methods. It can be understood that, to implement the foregoing functions, a communication apparatus includes corresponding hardware structures and/or software modules for performing the functions. A person of ordinary skill in the art should easily be aware that, in combination with the examples described in embodiments disclosed in this specification, modules, algorithms and operations may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the communication apparatus may be divided into function modules based on the foregoing method examples. For example, each function module may be obtained through division based on each function, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used.

Figure 17:
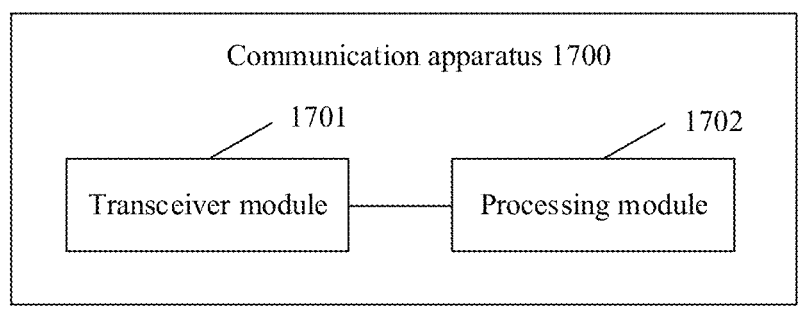
FIG. 17 is a schematic diagram of an embodiment of a communication apparatus according to an embodiment of this application.

The following describes in detail a communications apparatus in this application. FIG. 17 is a schematic diagram of an embodiment of the communication apparatus according to an embodiment of this application. The communication apparatus may be deployed in a server. A communication apparatus 1700 includes:

a transceiver module 1701, configured to collect information about a plurality of frames from a plurality of stations, where the information about the plurality of frames includes a first frame information set, information about each frame in the first frame information set includes sending time, contention time, and frame duration, and the contention time indicates time at which a corresponding frame starts to wait to be sent or duration in which the corresponding frame waits to be sent; and a processing module 1702, configured to determine interference information of the plurality of stations based on the information about the plurality of frames.

In an embodiment, the plurality of stations include a plurality of access points APs.

In an embodiment, the information about the plurality of frames further includes a second frame information set, and information about each frame in the second frame information set includes receiving time and frame duration.

The processing module 1702 is further configured to determine the interference information of the plurality of stations based on the first frame information set and the second frame information set.

In an embodiment, a first frame set in the plurality of frames is sent by the plurality of APs, and a second frame set in the plurality of frames is sent by a non-AP station. The first frame set includes one or more frames in the plurality of frames, the second frame set includes one or more frames in the plurality of frames, and the frames included in the first frame set and the second frame set are not repeated.

The processing module 1702 is further configured to obtain information about a frame in the first frame set and information about a frame in the second frame set from the plurality of APs.

In an embodiment, the plurality of stations include an AP and a non-AP station.

A first frame set in the plurality of frames is sent by the AP, and a second frame set in the plurality of frames is sent by the non-AP station. The first frame set includes one or more frames in the plurality of frames, the second frame set includes one or more frames in the plurality of frames, and the frames included in the first frame set and the second frame set are not repeated.

The processing module 1702 is further configured to collect information about a frame in the first frame set from the AP, and the server collects information about a frame in the second frame set from the non-AP station.

In an embodiment, the processing module 1702 is further configured to collect information about the plurality of frames within an information-collecting time period from the plurality of stations.

In an embodiment, the interference information includes one or more of the following items:

interference sources of at least one of the plurality of frames;

interference time of at least one frame in the plurality of frames, where the interference time of the at least one frame is time at which the at least one frame is interfered;

an interference source proportion of at least one frame in the plurality of frames, where the interference source proportion of the at least one frame is a ratio of time of interference caused by any interference source to the at least one frame to a sum of time of interference caused by all interference sources to the at least one frame;

an interference source sequence of at least one frame in the plurality of frames, where the interference source sequence of the at least one frame is a result of sorting all interference sources based on the time of interference caused by all the interference sources to the at least one frame;

interference sources of any station in the plurality of stations.

interference time of any station in the plurality of stations, where the interference time of the any station is time at which the any station is interfered;

an interference source proportion of any station in the plurality of stations, where the interference source proportion of the any station is a ratio of time of interference caused by any interference source to the any station to a sum of time of interference caused by all interference sources to the any station;

an interference source sequence of any station in the plurality of stations, where the interference source sequence of the any station is a result of sorting all the interference sources based on the time of interference caused by all the interference sources on the any station; and an interference time proportion of any station in the plurality of stations, where the interference time proportion of the any station is a ratio of a sum of interference time of the at least one frame of the any station to the information-collecting time period, and the information-collecting time period is a time period in which the server collects the information about the plurality of frames from the plurality of stations.

In an embodiment, the interference source includes a waiting interference source and/or a concurrent interference source. The waiting interference source is a station that causes waiting interference to the at least one frame or any station, and the concurrent interference source is a station that causes concurrent interference to the at least one frame or any station.

The waiting interference is that a transmitted frame of the interference source occupies waiting time of the at least one frame, or the waiting interference is that a transmitted frame of the interference source occupies waiting time of any transmitted frame of the any station.

The concurrent interference is that frame duration of the at least one frame and frame duration of the transmitted frame of the interference source coincide or overlap, or the concurrent interference is that frame duration of the transmitted frame of the interference source and frame duration of any transmitted frame of the any station coincide or overlap.

The interference time includes waiting interference time and/or concurrent interference time. The waiting interference time is time at which the at least one frame is subject to waiting interference or time at which the any station is subject to waiting interference, and the concurrent interference time is time at which the at least one frame is subject to concurrent interference or time at which the any station is subject to concurrent interference.

In an embodiment, the plurality of frames include the first frame and the second frame, the plurality of stations include a first station and a second station, the first station sends the first frame, and the second station sends the second frame.

When sending time of the second frame is greater than waiting time of the first frame, and a sum of the sending time of the second frame and frame duration of the second frame is less than the sending time of the first frame, the interference time includes:

waiting interference time of the first frame, where the waiting interference time of the first frame is equal to contention time of the second frame.

In an embodiment, the plurality of frames include the first frame and the second frame, the plurality of stations include a first station and a second station, the first station sends the first frame, and the second station sends the second frame.

When sending time of the second frame is greater than or equal to frame duration of the first frame, and contention time of the second frame is less than a sum of sending time of the first frame and the frame duration of the first frame, the interference time includes:

concurrent interference time of the first frame, where the concurrent interference time of the first frame is equal to the contention time of the second frame.

In an embodiment, the interference time proportion of the any station in the plurality of stations includes:

waiting interference time proportion of the any station, where the waiting interference time proportion is a ratio of waiting interference time of a transmitted frame of the any station to the information-collecting time period, the waiting interference time is a sum of backoff time of transmitted frames that are in the any station and on which waiting interference occurs, and the backoff time of the transmitted frame is equal to a difference between sending time of the transmitted frame and contention time of the transmitted frame.

In an embodiment, the interference source proportion of the at least one frame in the plurality of frames includes:

waiting interference source proportion of the at least one frame, where the waiting interference source proportion is a ratio of a first time period to a plurality of first time periods, the first time period is an overlapping time period between frame duration of any waiting interference frame and backoff time of a transmitted frame, the waiting interference frame is a frame that causes waiting interference to the transmitted frame, and the plurality of first time periods are a sum of first time periods of all waiting interference frames that cause waiting interference to the transmitted frame.

In an embodiment, the interference time proportion of the any station in the plurality of stations includes:

a concurrent interference time proportion of the any station, where the concurrent interference time proportion of the any station is a ratio of concurrent interference time of a transmitted frame of the any station to the information-collecting time period, and the concurrent interference time is frame duration of the transmitted frame that is in the any station and on which concurrent interference occurs.

In an embodiment, the interference source proportion of the at least one frame in the plurality of frames includes:

a concurrent interference source proportion of the at least one frame, where the concurrent interference source proportion is a ratio of a second time period to a plurality of second time periods, the second time period is frame duration of any concurrent interference frame, the concurrent interference frame is a frame that causes concurrent interference to a transmitted frame of the any station, and the plurality of second time periods are a sum of frame duration of all concurrent interference frames that cause concurrent interference to the transmitted frame.

In an embodiment, the information about at least one of the plurality of frames further includes one or more of the following items:

a frame type of the at least one frame, a frame subtype of the at least one frame, an uplink identifier or a downlink identifier of the at least one frame, a source address of the at least one frame, a destination address of the at least one frame, or an identifier indicating whether the at least one frame is successfully transmitted.

All related content of the operations in the foregoing method embodiments may be cited in function descriptions of the corresponding functional modules. Details are not described herein again.

In this embodiment, the communication apparatus 1700 is presented in a form of functional modules obtained through division in an integrated manner. The module herein may be an ASIC, a circuit, a processor that executes one or more software or firmware programs, a memory, an integrated logic circuit, and/or another component capable of providing the foregoing functions.

Because the communication apparatus 1700 provided in this embodiment may perform the foregoing interference information detection method, for technical effects that can be achieved by the communication apparatus 1700, refer to the foregoing method embodiments. Details are not described herein again.

The communication apparatus in the foregoing embodiment may be a server, or may be a chip applied to a server, or another combined device, component, or the like that can implement a function of the foregoing server. When the communication apparatus is a server, the transceiver module (including a sending module and a receiving module) may be a transceiver. The transceiver may include an antenna, a radio frequency circuit, and the like. The processing module may be a processor, for example, a baseband chip. When the communication apparatus is a component that has a function of the server, the transceiver module may be a radio frequency unit, and the processing module may be a processor. When the communication apparatus is a chip system, the receiving module may be an input port of the chip system, the sending module may be an output interface of the chip system, and the processing module may be a processor of the chip system, for example, a central processing unit (CPU).

An embodiment of this application further provides a computer-readable storage medium, including instructions. When the instructions are run on a computer, the computer is enabled to control a server to perform any implementation shown in the foregoing method embodiments.

The embodiment of this application further provides a computer program product. The computer program product includes computer program code, when the computer program code is run on a computer, the computer is enabled to perform any implementation shown in the foregoing method embodiments.

Further, an embodiment of this application further provides a computer program product. When the computer program product runs on a network device, the network device is enabled to perform any implementation shown in the foregoing method embodiments.

An embodiment of this application further provides a chip system, including a processor and an interface circuit. The interface circuit is configured to receive instructions and transmit the instructions to the processor. The processor is configured to implement the method in any one of the foregoing method embodiments.

In an embodiment, the chip system further includes a memory, and there may be one or more processors in the chip system. The processor may be implemented by using hardware, or may be implemented by using software. When the processor is implemented by using hardware, the processor may be a logic circuit, an integrated circuit, or the like. When the processor is implemented by using software, the processor may be a general-purpose processor, and the method in any one of the foregoing method embodiments is implemented by reading software code stored in the memory.

In an embodiment, there may alternatively be one or more memories in the chip system. The memory may be integrated with the processor, or may be disposed independent of the processor. This is not limited in this application. For example, the memory may be a non-transitory processor, for example, a read-only memory ROM. The memory and the processor may be integrated in a same chip, or may be separately disposed on different chips. A type of the memory and a manner of disposing the memory and the processor are not specifically limited in this application.

The foregoing describes the embodiments of this application in detail. Operations in the methods in the embodiments of this application may be sequentially scheduled, combined, or deleted according to an actual requirement. Modules in the apparatus in the embodiments of this application may be divided, combined, or deleted according to an actual requirement.

It should be understood that "one embodiment" or "an embodiment" mentioned in the entire specification means that particular features, structures, or characteristics related to embodiments are included in at least one embodiment of this application. Therefore, "in one embodiment" or "in an embodiment" appearing throughout the specification does not necessarily refer to a same embodiment. In addition, these particular features, structures, or characteristics may be combined in one or more embodiments by using any appropriate manner. It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in embodiments of this application, "B corresponding to A" indicates that B is associated with A, and B may be determined according to A. However, it should be further understood that determining B based on A does not mean that B is determined based only on A. B may alternatively be determined based on A and/or other information.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software function unit.

What is claimed is:

1. An interference information detection method, comprising:
    collecting, by a server, information about a plurality of frames from a plurality of stations, wherein the information about the plurality of frames comprises a first frame information set, information about each frame in the first frame information set comprises sending time, contention time, and frame duration, and the contention time indicates time at which a corresponding frame starts to wait to be sent or duration in which the corresponding frame waits to be sent; and
    determining, by the server, interference information of the plurality of stations based on the information about the plurality of frames.

2. The method according to claim 1, wherein
the plurality of stations comprise a plurality of access points (APs).

3. The method according to claim 2, wherein the information about the plurality of frames further comprises a second frame information set, and information about each frame in the second frame information set comprises receiving time and frame duration; and
the determining, by the server, interference information of the plurality of stations based on the information about the plurality of frames comprises:
determining, by the server, the interference information of the plurality of stations based on the first frame information set and the second frame information set.

4. The method according to claim 2, wherein
a first frame set in the plurality of frames is sent by the plurality of APs, a second frame set in the plurality of frames is sent by a non-AP station, the first frame set comprises one or more frames in the plurality of frames, the second frame set comprises one or more frames in the plurality of frames, and the frames comprised in the first frame set and the second frame set are not repeated; and
the collecting, by the server, information about a plurality of frames from a plurality of stations comprises:
obtaining, by the server, information about the frame in the first frame set and information about the frame in the second frame set from the plurality of APs.

5. The method according to claim 1, wherein
the plurality of stations comprise an AP and a non-AP station;
a first frame set in the plurality of frames is sent by the AP, a second frame set in the plurality of frames is sent by the non-AP station, the first frame set comprises one or more frames in the plurality of frames, the second frame set comprises one or more frames in the plurality of frames, and the frames comprised in the first frame set and the second frame set are not repeated; and
the collecting, by the server, information about a plurality of frames from a plurality of stations comprises:
collecting, by the server, information about the frame in the first frame set from the AP, and collecting, by the server, information about the frame in the second frame set from the non-AP station.

6. The method according to claim 1, wherein the collecting, by the server, information about a plurality of frames from a plurality of stations comprises:
collecting, by the server, information about the plurality of frames within an information-collecting time period from the plurality of stations.

7. The method according to claim 1, wherein the interference information comprises one or more of the following:
interference sources of at least one of the plurality of frames;
an interference time of at least one frame in the plurality of frames, wherein the interference time of the at least one frame is time at which the at least one frame is interfered;
an interference source proportion of at least one frame in the plurality of frames, wherein the interference source proportion of the at least one frame is a ratio of time of interference caused by any interference source to the at least one frame to a sum of time of interference caused by all the interference sources to the at least one frame;
an interference source sequence of at least one frame in the plurality of frames, wherein the interference source sequence of the at least one frame is a result of sorting all the interference sources based on the interference time of the at least one frame;
interference sources of any station in the plurality of stations;
an interference time of any station in the plurality of stations, wherein the interference time of the any station is time at which the any station is interfered;
an interference source proportion of any station in the plurality of stations, wherein the interference source proportion of the any station is a ratio of time of interference caused by any interference source to the any station to a sum of time of interference caused by all the interference sources to the any station;
an interference source sequence of any station in the plurality of stations, wherein the interference source sequence of the any station is a result of sorting all the interference sources based on the time of interference caused by all the interference sources on the any station; or
an interference time proportion of any station in the plurality of stations, wherein the interference time proportion of the any station is a ratio of a sum of interference time of at least one frame of the any station to an information-collecting time period, and the information-collecting time period is a time period in which the server collects the information about the plurality of frames from the plurality of stations.

8. The method according to claim 7, wherein
the interference source comprises a waiting interference source and/or a concurrent interference source, wherein the waiting interference source is a station that causes waiting interference to the at least one frame or any station, and the concurrent interference source is a station that causes concurrent interference to the at least one frame or any station;
the waiting interference is that a transmitted frame of the interference source occupies waiting time of the at least one frame, or the waiting interference is that a transmitted frame of the interference source occupies waiting time of any transmitted frame of the any station;
the concurrent interference is that frame duration of the at least one frame and frame duration of the transmitted frame of the interference source coincide or overlap, or the concurrent interference is that frame duration of the transmitted frame of the interference source and frame duration of any transmitted frame of the any station coincide or overlap; and
the interference time comprises waiting interference time and/or concurrent interference time, wherein the waiting interference time is time at which the at least one frame is subject to the waiting interference or time at which the any station is subject to the waiting interference, and the concurrent interference time is time at which the at least one frame is subject to the concurrent interference or time at which the any station is subject to the concurrent interference.

9. The method according to claim 8, wherein the plurality of frames comprise a first frame and a second frame, the plurality of stations comprise a first station and a second station, the first station sends the first frame, and the second station sends the second frame; and
when sending time of the second frame is greater than waiting time of the first frame, and a sum of the sending time of the second frame and frame duration of the second frame is less than the sending time of the first frame, the interference time comprises:

waiting interference time of the first frame, wherein the waiting interference time of the first frame is equal to contention time of the second frame.

10. The method according to claim 8, wherein the plurality of frames comprise a first frame and a second frame, the plurality of stations comprise a first station and a second station, the first station sends the first frame, and the second station sends the second frame; and when sending time of the second frame is greater than or equal to frame duration of the first frame, and contention time of the second frame is less than a sum of sending time of the first frame and the frame duration of the first frame, the interference time comprises:

concurrent interference time of the first frame, wherein the concurrent interference time of the first frame is equal to the contention time of the second frame.

11. The method according to claim 8, wherein the interference time proportion of the any station in the plurality of stations comprises:

waiting interference time proportion of the any station, wherein the waiting interference time proportion is a ratio of waiting interference time of a transmitted frame of the any station to the information-collecting time period, the waiting interference time is a sum of backoff time of transmitted frames that are in the any station and on which waiting interference occurs, and the backoff time of a transmitted frame is equal to a difference between sending time of the transmitted frame and contention time of the transmitted frame.

12. The method according to claim 8, wherein the interference source proportion of the at least one frame of the plurality of frames comprises:

a waiting interference source proportion of the at least one frame, wherein the waiting interference source proportion is a ratio of a first time period to a plurality of first time periods, the first time period is an overlapping time period between frame duration of any waiting interference frame and backoff time of the transmitted frame, the waiting interference frame is a frame that causes waiting interference to the transmitted frame, and the plurality of first time periods are a sum of first time periods of all waiting interference frames that cause waiting interference to the transmitted frame.

13. The method according to claim 8, wherein the interference time proportion of the any station in the plurality of stations comprises:

a concurrent interference time proportion of the any station, wherein the concurrent interference time proportion of the any station is a ratio of concurrent interference time of a transmitted frame of the any station to the information-collecting time period, and the concurrent interference time is frame duration of the transmitted frame that is in the any station and on which concurrent interference occurs.

14. The method according to claim 8, wherein the interference source proportion of the at least one frame of the plurality of frames comprises:

a concurrent interference source proportion of the at least one frame, wherein the concurrent interference source proportion is a ratio of a second time period to a plurality of second time periods, the second time period is frame duration of any concurrent interference frame, the concurrent interference frame is a frame that causes concurrent interference to a transmitted frame of the any station, and the plurality of second time periods are a sum of frame duration of all concurrent interference frames that cause concurrent interference to the transmitted frame.

15. The method according to claim 1, wherein the information about at least one of the plurality of frames further comprises one or more of the following:

a frame type of at least one frame, a frame subtype of the at least one frame, an uplink identifier or a downlink identifier of the at least one frame, a source address of the at least one frame, a destination address of the at least one frame, or an identifier indicating whether the at least one frame is successfully transmitted.

16. A communication apparatus, used as a server, comprising:

a memory, wherein the memory stores instructions; and
a processor, configured to execute the instructions, so that the server is enabled to perform operations of:
collecting, by the server, information about a plurality of frames from a plurality of stations, wherein the information about the plurality of frames comprises a first frame information set, information about each frame in the first frame information set comprises sending time, contention time, and frame duration, and the contention time indicates time at which a corresponding frame starts to wait to be sent or duration in which the corresponding frame waits to be sent; and
determining, by the server, interference information of the plurality of stations based on the information about the plurality of frames.

17. A non-transitory computer-readable storage medium, comprising instructions, wherein when the instructions are executed by a processor to perform operations of:

collecting, by a server, information about a plurality of frames from a plurality of stations, wherein the information about the plurality of frames comprises a first frame information set, information about each frame in the first frame information set comprises sending time, contention time, and frame duration, and the contention time indicates time at which a corresponding frame starts to wait to be sent or duration in which the corresponding frame waits to be sent; and
determining, by the server, interference information of the plurality of stations based on the information about the plurality of frames.

18. The computer-readable storage medium according to claim 17, wherein the plurality of stations comprise a plurality of access points (APs).

19. The computer-readable storage medium according to claim 18, wherein the information about the plurality of frames further comprises a second frame information set, and information about each frame in the second frame information set comprises receiving time and frame duration; and the determining, by the server, interference information of the plurality of stations based on the information about the plurality of frames comprises:
determining, by the server, the interference information of the plurality of stations based on the first frame information set and the second frame information set.

20. The computer-readable storage medium according to claim 18, wherein a first frame set in the plurality of frames is sent by the plurality of APs, a second frame set in the plurality of frames is sent by a non-AP station, the first frame set comprises one or more frames in the plurality of frames, the second frame set comprises one or more frames in the plurality of frames, and the frames comprised in the first frame set and the second frame set are not repeated; and the collecting, by the server, information about a plurality of frames from a plurality of stations comprises:

obtaining, by the server, information about the frame in the first frame set and information about the frame in the second frame set from the plurality of APs.

\* \* \* \* \*